United States Patent
Santorius et al.

(10) Patent No.: US 6,322,300 B1
(45) Date of Patent: Nov. 27, 2001

(54) MILLING MACHINE

(75) Inventors: Rolf Santorius, Uhingen-Nassachmühle; Paul Dieter Scharpf, Schlat; Wolf-Dietrich Voss, Boll; Matthias Kohlhase, Schramberg-Sulgen; Herbert Kiefer, Steisslingen; Leo Schreiber, Schwäbisch-Gmünd, all of (DE)

(73) Assignee: Boehringer Werkzeugmaschinen GmbH (DE)

( * ) Notice: Subject to any disclaimer, the term of this patent is extended or adjusted under 35 U.S.C. 154(b) by 0 days.

(21) Appl. No.: 09/202,884

(22) PCT Filed: Jul. 1, 1997

(86) PCT No.: PCT/EP97/03419

§ 371 Date: Jul. 12, 1999

§ 102(e) Date: Jul. 12, 1999

(87) PCT Pub. No.: WO98/00262

PCT Pub. Date: Jan. 8, 1998

(30) Foreign Application Priority Data

Jul. 2, 1996 (DE) .............................. 196 26 629

(51) Int. Cl.$^7$ ..................................... B23C 3/06
(52) U.S. Cl. .............................. 409/199; 82/106; 409/200
(58) Field of Search .................... 409/166, 199, 409/200, 201, 244; 29/6.01, 888.08, 27 R; 82/106

(56) References Cited

U.S. PATENT DOCUMENTS

| | | | | |
|---|---|---|---|---|
| 4,326,323 | * | 4/1982 | Kralowetz et al. ........................ | 29/6 |
| 4,337,011 | * | 6/1982 | Schmid ................................ | 409/199 |
| 5,707,187 | * | 1/1998 | Arnold ................................ | 409/200 |
| 5,725,339 | * | 3/1998 | Yoshita ............................... | 409/132 |
| 5,765,270 | * | 6/1998 | Schrod ................................ | 29/27 R |
| 5,997,452 | * | 12/1999 | Assie .................................. | 483/15 |
| 6,050,757 | * | 4/2000 | Gesell ................................ | 409/132 |

FOREIGN PATENT DOCUMENTS

| | | | |
|---|---|---|---|
| 0720883 | 12/1995 | (EP) . | |
| 0054114 | * | 4/1980 | (JP) ..................................... 409/199 |

OTHER PUBLICATIONS

Brochure "LF SF" of Gebr. Heller Maschinenfabrik GmbH; Aug. 1954; pp. 39–41.

Brochure "RFK/RFKL" Gebr Heller Maschinenfabrik GmbH; Jun. 1978; pp. 2–11.

Brochure "RFN" Gebr. Heller Maschinenfabrik GmbH; Mar. 1988; pp. 2–15.

(List continued on next page.)

*Primary Examiner*—William Briggs
(74) *Attorney, Agent, or Firm*—Norris, McLaughlin & Marcus P.A.

(57) ABSTRACT

The problem addressed by the invention is to provide a milling machine which can be used to machine eccentric end faces and peripheral faces and which ensures a short machining time despite its simple design. A milling machine of this king for machining workpieces and with means of clamping eccentric end faces or enveloping surfaces, e.g. of a crankshaft (1), with a bed (20), with two mutually facing chucks (21, 22) to accommodate the workpiece (1), at least one of these chucks being rotatable and positionable (C1 axis) by means of a headstock (23, 24), with a tool holder (25, 26) which can be moved at right angles to the Z axis and has a rotatable milling cutter (5, 6), and with a control mechanism is characterized by a plurality of tool holders which can be controlled independently of each other in terms of both milling cutter rotation and travel in a transverse direction, and in that the control mechanism controls not only the rotation of the workpiece but also the transverse movement of the tool holders and the rotation of the milling cutters.

29 Claims, 26 Drawing Sheets

OTHER PUBLICATIONS

G. Spur et al.; "Handbuch der Fertigungstechnik" Carl Hanser Verlag München Wien 1979; pp. 142–143; 436–442; 448–4560; 466–467; 486–490; 512–514;556–557; 564–565; 569–570.

Programmierangeitung uni–Pro NC80–R; Gebr. Heller Maschinenfabrik GmbH; 1993; pp. 1–6.

Brochure; Haupt—und Hublagerbearbeitung von Kurbelwellen durch Rundfräsen; Gebr. Heller Maschinenfabrik GmbH; Nov. 1973; pp. 2–11.

K. Sorge; "Die Technolgie des Drehfräsen"; Carl Hanser Verlag München Wien 1984; pp. cover, 79–80; 83–86.

Fig. AZ 22891; Gebr. Heller Maschinenfabrik GmbH; Jan. 1998.

Handbook "Modern Metal Cutting" Sandvik Coromant, 1994; pp. 33; X–81; X120; X121; X134; X135; X149; X152–X159.

* cited by examiner

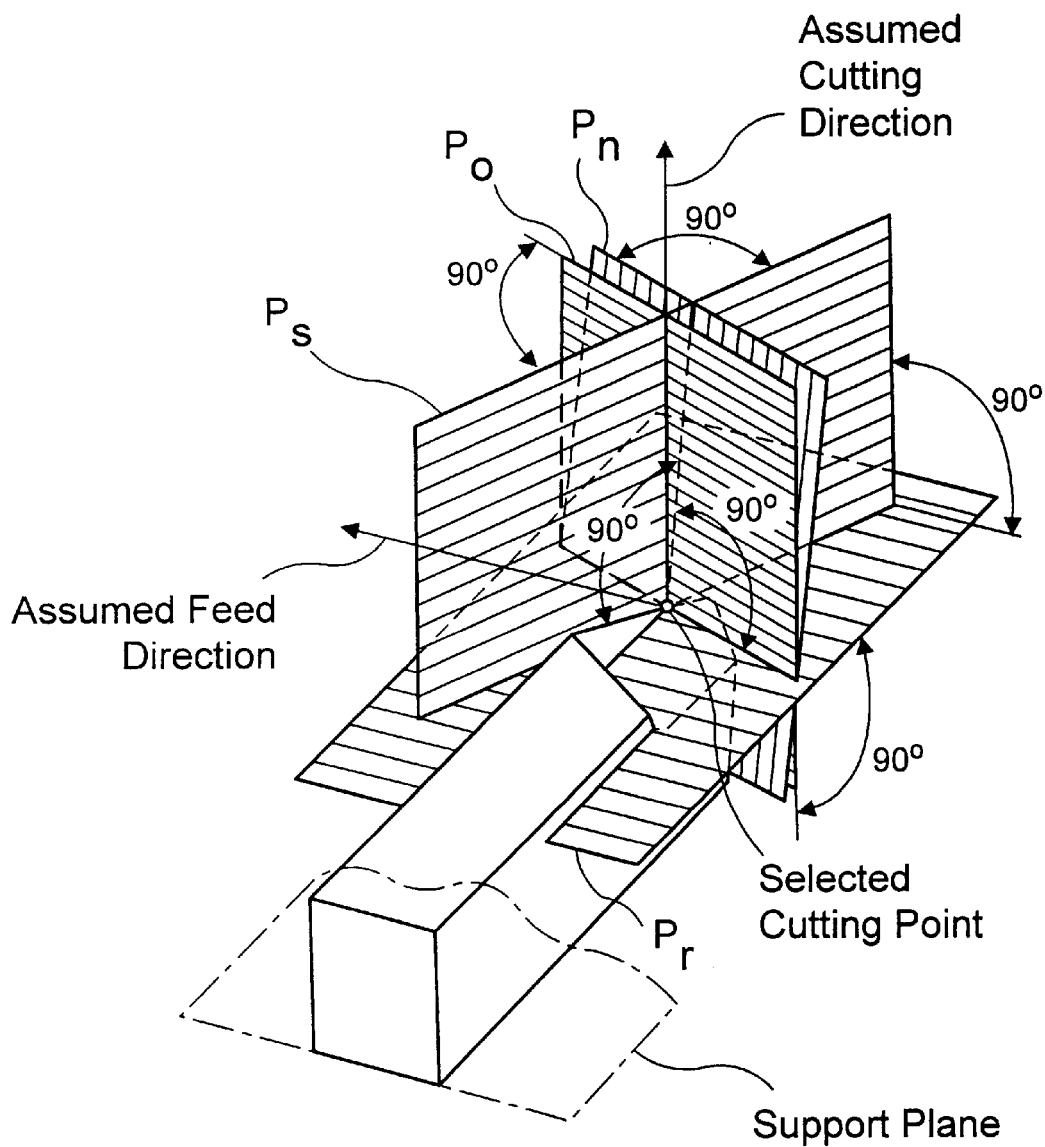
F I G. 14

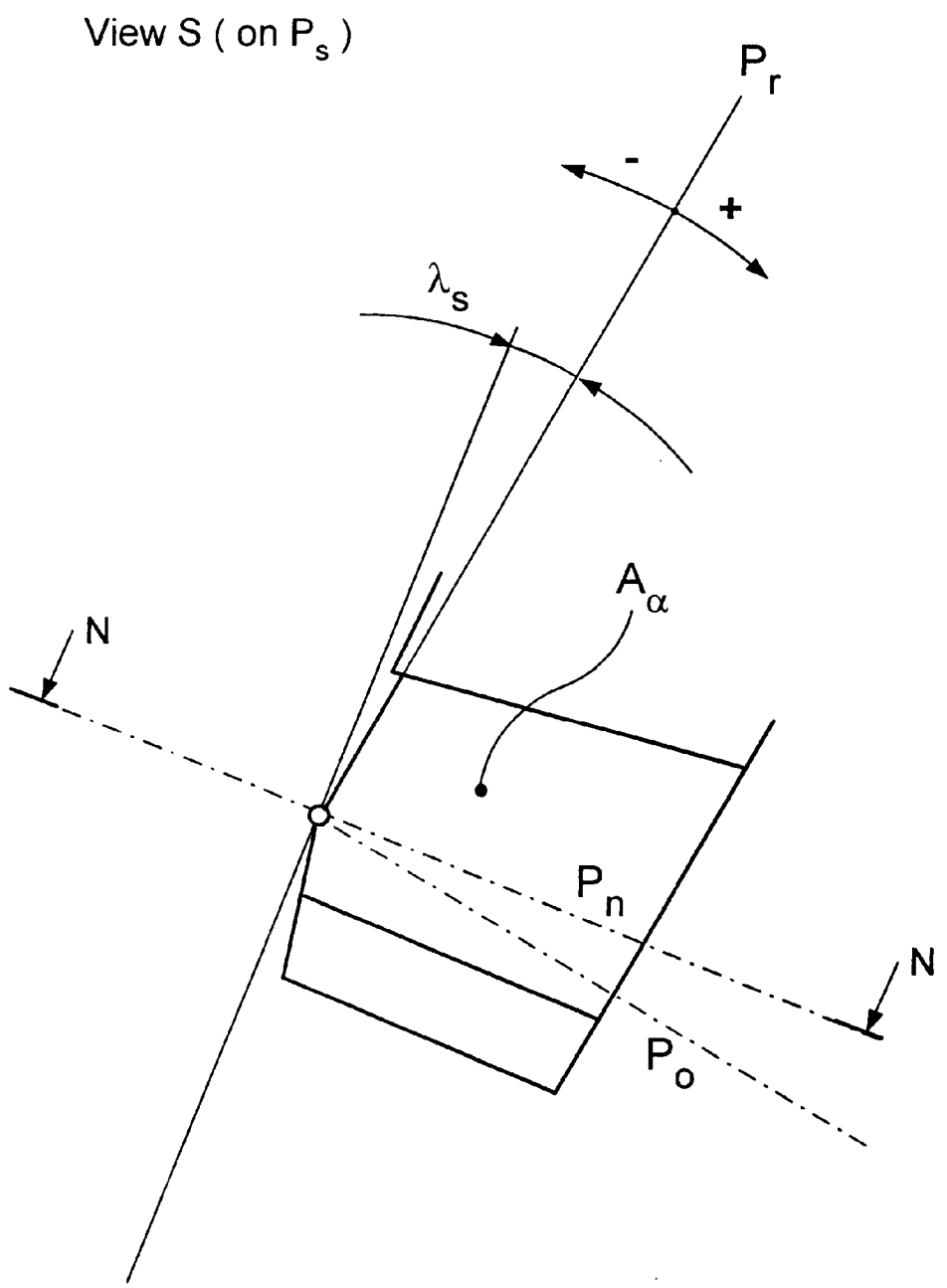
F I G. 18e

MILLING MACHINE

BACKGROUND OF THE INVENTION

The invention relates to milling machines which can be used to machine both eccentric end faces and circumferential faces, e.g. peripheral faces.

A typical workpiece having such faces is a crankshaft, for which reason the following text always refers to a crankshaft, without limiting the possible workpieces to this alone.

For crankshafts, metal-removing machining is known both with external-milling machines and with internal-milling machines, that is to say by means of a milling cutter which annularly surrounds the crankshaft and has inwardly directed teeth. In this case, the axis of rotation of the milling cutter lies parallel to the longitudinal axis of the crankshaft.

In this case, the crankshaft is held at its ends, that is to say on one sides at its end flange and on the other side at its end journal, centrically, that is to say on the centre axis of its centre bearings, in chucks on both sides.

In a known solution, the crankshaft does not move during the machining, and thus the chucks are not driven by a spindle head. For machining of the crankpin journals, the annular internal-milling cutter rotates, on the one hand, about its own centre point in order to generate the cutting speed and, on the other hand, on an orbit about the centre of the crankpin journal to be machined, in order to mill the peripheral face thereof. Web end faces and web circumferential surfaces can also be machined in this manner, as long as the radius of curvature is smaller than the radius of the circuit of the cutting edges of the internal-milling cutter. With the crankshaft stationary, the internal-milling cutter can be displaced in a defined manner in the X- and Y-directions.

The mounting which annularly surrounds the internal-milling cutter is extremely stable, but has a relatively wide extent in the Z-direction, for which reason, for short crankshafts, the simultaneous deployment of two internal-milling cutters axially spaced apart on the same crankshaft can be problematical.

It is also known in that solution to rotate the crankshaft slowly during the machining, that is to say to be able to drive at least one of the chucks in a defined manner by means of a spindle head and to set its rotational position. This realisation of the C-axis for the workpiece makes it possible to dispense with the movement of the tool slide rest in the Y-direction, so that therefore only the tool slide rest for the internal-milling cutter merely comprises a lower slide for movement in the Z-direction and an upper slide for movement in the X-direction.

Furthermore, external-milling machines are known, in which the milling units—in addition to the displaceability in the Z-direction—were displaceable in a defined manner in the X-direction, and the chucks for the crankshaft were held in one or two spindle heads. Realisation of the C-axis on the workpiece meant that the external-milling cutter was guided on in a defined manner in the X-direction during the machining of eccentric surfaces. However, the machining of eccentric surfaces did not entail two or more external-milling units, operating independently of one another, being deployed on the same crankshaft. This was only possible when machining the eccentric surfaces, e.g. the centre-bearing journals.

In the case of the known milling machines, work is carried out with a conventional, negative cutting-edge geometry and cutting speeds on workpieces made of grey cast iron (GGG60–GGG80) of at most 160 m/min. As a result, very high cutting forces are introduced into the workpiece, for which reason it is also necessary as a rule to support the centre of the workpiece by means of steady rests, etc. A further drawback consisted in the fact that a high proportion of the process heat was introduced both into the workpiece, and thus also into the tool, and only a small proportion was dissipated via the chips.

SUMMARY OF THE INVENTION a) Technical Object

It is therefore the object of the invention to provide a milling machine for machining both eccentric end faces and circumferential faces which, despite a simple design, ensures a short machining time.

b) Solution to the Object

This object is achieved by means of the characterizing features of claim 1. Advantageous embodiments result from the subclaims.

Owing to the C-axis of the workpiece and the resultant possible defined, but relatively slow rotation of the workpiece of generally less than 60 revolutions/minute, frequently only 15–20 revolutions/minute, it is sufficient that the tool slide rests has to be able to move the tool, generally an external-milling cutter, in a defined manner, in addition to in the Z-direction, only also in the X-direction.

This rotation of the workpiece is so slow that any imbalances of the workpiece which may arise do not have a disadvantageous dynamic effect on the result of the machining.

c) Advantages

The short machining time is achieved due to the fact that, despite the rotation of the workpiece, e.g. of the crankshaft, two tool units can work, independently of one another, on eccentric surfaces whose rotational positions do not coincide, which effect is only possible by means of a machine control system which controls the independent tool slide rests as a function of the position and rotation of the workpiece, it preferably being possible to specify optimisation targets, such as for example the chip thickness or the cutting speed.

In this case, for a specific workpiece it is possible even before machining to calculate, for each instant of the machining, the rotational position, direction of movement and speed of the workpiece, the rotational speed of the milling cutters, the X-position and direction of movement and speed of movement of the milling cutters, etc., and to store these parameters in a working program, for example as a table of settings for various states of the machining, which program can then be executed by the machine control system.

d) Further Configurations

Another possibility consists in taking into account at the same time the current actual position and actual movement of the workpiece during the machining and, as a function of these, controlling the tool slide rests. However, this is considerably more complex in terms of the sensor technology and the control outlay.

Owing to the relatively low rotational speed of the workpiece, slip errors, that is to say deviations between the desired and the actual position, during the movement of the workpiece are relatively low.

In order also to achieve this on the tool side, for example when using a side-milling cutter, the diameter is designed to be larger than would be necessary for the penetration depth for milling the big-end journal of a crankshaft. This enlargement of the side-milling cutter results in a likewise relatively low rotational speed of the milling cutter, so that in addition the rotational speed of the tool can be constantly adjusted with slip errors which are only negligibly low.

For machining a passenger-car crankshaft with a throw of 10–15 cm, the diameter of a side-milling cutter used for this purpose is about 800 mm. This also results in thermal advantages, since a relatively long time is available for cooling between two successive deployments of one and the same cutting edge of the milling cutter.

If suitable cutting materials and cutting-edge geometry are used, cutting speeds of 800 m/min and even significantly more can be achieved, and in addition the machine does not need any cooling lubricant at the machining location, since dry milling is possible, in particular with a positive tool geometry.

Instead of a linear movement of the milling cutter in the X-direction, it is also possible to pivot the milling cutter about an axis parallel to the Z-axis, which is necessary in particular when using a slotting cutter, the axis of rotation of which is arranged perpendicular to the longitudinal axis of the crankshaft. The cutting edges on the front end face of a slotting cutter of this kind machine circumferential faces, that is to say, for example, the peripheral faces of the crankpin journals of a crankshaft, and its cutting edges on the circumferential face machine the side faces, for example the web end faces.

The use of a side-milling cutter, in which therefore cutting edges are arranged on its circumferential region and/or in the transition region between the circumferential face and the end face of the cylindrical base body, is to be preferred to an internal-milling cutter, since even with a width of the side-milling cutter in the Z-direction of only about 20–25 mm and a diameter of about 800 mm such a side-milling cutter is sufficiently stable to be mounted free on only one side. If two side-milling cutters which act on the workpiece from the same side but are axially spaced apart are used, these two side-milling cutters can thus be mounted driveably on mutually remote sides on their respective slide rests, so that these two side-milling cutters can in theory be moved towards one another in the axial direction as far as until their cutting edges make contact on the end side.

In the case of an internal-milling cutter mounted and surrounded along the outer circumference, it is not possible to achieve such a narrow design in the Z-direction and to bring two milling units so close together.

Moreover, cylindrical external-milling cutters are easier to equip, and also to adjust and exchange, which is an extremely important factor in view of the fact that in currently possible processes the idle times and non-cutting times of a machine compared to the cutting times are becoming ever more significant.

The cutting edges in milling cutters of this kind are usually positioned along the circumference as screwed-on throw-away cutting-tool tips. In principle, a distinction is made here between three different types cutting tip with regard to their use: The so-called web-cutting tip machines end faces, that is to say, for example, web side faces, the so-called journal-cutting tip machines circumferential faces, that is to say, for example, the peripheral face of a bearing journal of a crankshaft or the outer circumferential contour of a web, possible peripheral faces being any desired convexly curved contour and plane, for example surfaces arranged tangentially with respect to the Z-axis and even concave surfaces, as long as their radius of curvature is greater than the radius of the side-milling cutter used.

The milling of planar surfaces as fastening surface for additional weights or for balancing operations is a particularly important advantage of external milling over internal milling.

Furthermore, to produce the so-called undercut, that is to say a recess at the transition between the peripheral face of the journal and the end-side web end face, special undercut-cutting tips are present.

It is possible, for example, to arrange only journal-cutting tips on a side-milling cutter, which provides the possibility of additionally displacing such a side-milling cutter in a defined manner in the Z-direction during the machining, and thus of being able to mill bearing journals of virtually any desired width using a narrow side-milling cutter without annularly encircling machined shoulders. In this case, the undercut has to be produced by a separate milling cutter.

Another possibility consists in arranging the undercut-cutting tips directly on one circumferential edge, or even on both circumferential edges, of the milling cutter which bears the journal-cutting tips, and thus in milling the undercut together with the peripheral face of the journal. If the two-sided undercut-cutting tips are arranged on a milling cutter, the milling cutter corresponds to the finished axial length of the bearing location, that is to say only to a specific workpiece to be produced. If one milling cutter is used for the left-hand undercut and the left-hand half of the peripheral face of the journal and another milling cutter is used for the right-hand half of the journal face, it is possible to produce variable bearing widths in the Z-direction using one and the same pair of side-milling cutters by means of variable intersection in the centre.

The web-cutting tips are mostly arranged on a separate side-milling cutter, and again preferably on both end faces of the side-milling cutter, in order to be able to machine side faces which are directed both in the +Z and in the Z-direction. Arrangement on a separate side-milling cutter is sensible, since relatively large volumes are to be removed along the web side faces and thus these web-cutting tips wear more quickly than, for example, the journal-cutting tips or the undercut-cutting tips.

The milling machine according to the invention may, for example, comprise only two milling units, which can be moved independently of one another and which work on the crankshaft from approximately the same side, merely being spaced apart axially. As a rule, the movement in the X-direction will be directed obliquely from above or even perpendicularly towards the crankshaft, in that either the bed of the milling machine itself or at least the transverse guide along which the upper slide runs on the lower slide of the tool slide rest is already positioned either obliquely or steeply.

However, it is also possible for two independently operating tool units to work on the workpiece from opposite sides or else with transverse movements directed towards one another in the manner of a V.

If, in these cases, in addition a plurality of tool slide rests are arranged one after the other, spaced apart in the Z-direction, it is also possible for four or even more tool units to work simultaneously on one and the same workpiece.

In addition, a single tool unit may have a multiple tool, that is to say, for example, two side-milling cutters which are spaced apart in the Z-direction but can only be moved synchronously with one another, for example as a tandem tool. This is useful in particular if the crankshaft to be machined has two crankpin journals which are aligned with one another, such as for example the crankshafts of four-cylinder in-line engines. However, since multiple tools of this kind are coupled in terms of their transverse movement and rotation, they are only to be considered as a single tool unit.

In the case of the double-sided driving of the crankshaft held in the chucks, the double-sided spindle drives are preferably electrically synchronised.

Even when machining the workpiece using a machining program worked out prior to the machining and stored in the machine control system, this machining program can be corrected subsequently on the basis of the measurements of the first finished parts:

It is known that the result of the machining is in practice slightly out-of-round, despite the machining of a precise cylindrical surface, owing to the deflection of the crankshaft in the transverse direction by the cutting forces. It is attempted to compensate for this by milling a theoretically out-of-round contour which, owing to the deflection of the crankshaft in the transverse direction which occurs in practice, then results in a very close approximation of a completely cylindrical peripheral face. Since this in theory can only roughly be taken into account when establishing the machining program, the machine control system includes the possibility, after producing the first samples, of inputting the out-of-roundness still present with regard to size and angular position into the control system using an input panel, the control system them automatically, and preferably for each bearing journal individually, if necessary even beyond its axial length, adjusting the transverse movements of the milling units differently for the respective angular position of the workpiece.

If two milling units which are drivable and operate independently of one another are machining different, eccentric surfaces for machining on one and the same rotatable and drivable crankshaft, and it is intended to maintain an optimum value or range for the chip thickness, under certain circumstances it is only possible to achieve the desired maximum cutting speed, for example the cutting speed of HS milling, at one machining point.

In order to keep the chip thickness or average chip thickness within the optimum range at the other machining points, under certain circumstances the rotational speed of the milling cutter has to be reduced there, and consequently so too does the cutting speed. For this reason, at the start of the journal machining the milling cutter is not moved immediately radially as far as the desired dimension, but rather is moved slowly as far as the radial desired dimension while the crankshaft is rotating slowly, over the course of a rotation of the journal to be machined of 30–90, preferably of 50–70°. As a result, the stipulation with regard to the chip thickness is observed even at the beginning of the machining of a bearing journal, and inadmissibly high transverse forces are not introduced into the workpiece at the start of the machining. After reaching the radial desired dimension, it is necessary to execute a complete cycle of the journal surface, preferably about 100° circumferential surface, in order to achieve an optimum machining result.

If there is no optimum value for the chip thickness with regard to the life-cycle performance of a tool, the independent tool units would be optimised with a view to maximum cutting speed. These laws, which were determined primarily for machining grey cast iron (GGG60–GGG80), may under certain circumstances also be valid for other workpiece materials, such as steel, for which other groups of cutting materials are also employed.

The additional use of a positive tool geometry instead of the negative tool geometry which was previously used in milling and which nevertheless, primarily in connection with the low average or maximum chip thicknesses, leads to a sufficient tool life of the cutting means, in turn results in a reduction in the cutting forces and consequently also in a reduction in the driving powers required for the tool, which powers, for the size ratios indicated, is only about half to one third of the power required for internal milling or rotary turn broaching. In addition to the lower energy costs, this also minimises the waste heat problems of the drives, which always have a negative effect on the overall machine and the machining result.

The high-speed milling according to the invention may in this case be carried out, in particular, not only on the unhardened workpiece but also on the hardened (e.g. Rockwell hardness $H_{RC}$ of 60 to 62, in particular fully hardened) workpiece. In this case, the cutting material preferably used is cermet or polycrystalline boron nitride (PCB), and in the case of the latter in particular cubic boron nitride (CBN). In this case, it is preferable firstly to sinter a carbide cutting tool tip as usual which, however, has cavities in the cutting-edge area, e.g. in the tool face open towards the cutting edge. CBN powder is placed in these cavities in the base body and is then sintered.

It is not only the noses of throw-away cutting tool tips which can be reinforced in this manner, but also an entire cutting edge can be reinforced by arranging a plurality of CBN pallets next to one another along a cutting edge, or else by providing a bar-shaped CBN insert. It is consequently also possible to machine unhardened steel or cast iron, even by milling.

These cutting materials can also be used without cooling lubricant, that is to say dry, thus saving on disposal costs and environmental problems.

It is thus possible even as early as during the metal-removing machining to eliminate the distortion of the workpiece which due to the hardening process occurs in conventional production (metal-removing machining prior to hardening). Since, when using high-speed milling and in particular when using high-speed milling on the hardened workpiece, it is possible to achieve surface qualities which are acceptable as the final state of the workpiece, it is consequently possible to dispense with at least the rough-grinding operation altogether.

When machining the journal and web surfaces on crankshafts which consist of cast iron or steel and are machining in the unhardened state by means of an external circular-milling cutter, in particular by means of a disc-like milling cutter with cutting edges on the circumferential region, it has proven particularly advantageous to observe the following parameters:

Cutting speed during the roughing machining: at least 180, preferably 250–600 m/min, Cutting speed during the finishing machining: at least 200, preferably 300–800 m/min, Chip thickness: 0.05–0.5 mm, in particular 0.1–0.3 mm.

The tool used here is generally a disc-like tool body driven in rotation and having inserted throw-away cutting-tool tips. In this case, the configuration of the cutting-tool tips differs depending on their intended purpose (machining of the end faces on the webs, machining of the peripheral surfaces on the journals of the main bearing point and big-end journal points, production of the undercuts at the transition between peripheral surfaces and end faces) and they are also positioned differently with respect to the tool carrier or to the workpiece:

|  | Web-cutting tip | | Undercut-cutting tip | | Journal-cutting tip (face-cutting tip) | |
| --- | --- | --- | --- | --- | --- | --- |
| Basic material | K20–K25 | | K15 | | K10–K15 | |
| Coating | TiCN + Al₂O₃ + TiN or TiN + TiCN + Al₂O₃ + TlN or TiN + Al₂O₃ + TiN | | TiN | | TiCN + Al₂O₃ + TiN or TiN + TiCN + Al₂O₃ + TlN or TiN + Al₂O₃ + TiN | |
|  | from/to | esp. | from/to | esp. | from/to | esp. |
| Total thickness of the coating | 3–15 μm | 10–12 μm | 2–8 μm | 3–5 μm | 2–8 μm | 3–5 μm |
| $\gamma_p$ | +1° ... +8° | +5° | +4° | +4° | +2° | +2° |
| $\gamma_f$ | −4° ... +4° | −1° | +1° | +1° | +2° | +2° |
| $\gamma_n$ | +5° ... +14° | +9° | +9° | +9° | +9° | +9° |
| $\lambda_s$ | +2° ... +7 | +5° | +5° | +5° | +3° | +3° |
| κ | about +2° | +5° |  | +4° | — |  |
| Cutting edge rounding (CRE) | 0.01–0.05 mm | about 0.02 mm | about 0.02 mm | about 0.02 mm | about 0.02 mm | about 0.02 mm |
| Nose radius R | 1.2–2.0 mm | 1.6 mm | 1.6 mm | 1.6 mm | — | — |
| Length | min. 15.9 10 mm | 15.9 mm | 15.9 mm | 15.9 mm | 12.7 mm | 12.7 mm |
| Height | min. 12.7 10 mm | 12.7 mm | 12.7 mm | 12.7 mm | 12.7 mm | 12.7 mm |
| Thickness | min. 3 mm | 6.35 mm | 5.55 mm | 5.55 mm | 4.7 mm | 4.7 mm |
| Data with regard to the tool body: | | | | | | |
| Width of cut | 23 mm | | — | | 13 mm (split) to 22 mm (complete) | |
| Nominal diameter | e.g. 800 mm | | e.g. 800 mm | | e.g. 800 mm | |
| Pitch angle from cutting edge to cutting edge | 3.6° | | 5.5°–7.5° | | 5.5°–7.5° | |
| Pitch spacing from cutting edge to cutting edge | 25 mm | | 35–50 mm | | 35–50 mm | |
| Number of cutting tips | e.g. 200 | | e.g. 120 (split) to 200 (complete) | | e.g. 120 (split) to 200 (complete) | |

Data on the basic material relates to the known ISO application groups, in which:

K10: consists of 94.2% tungsten carbide (TC), 5.5% cobalt (Co) and 0.3% ... (Ta/C)

K20: consists of 93.2% TC, 6% Co and 0.6% Ta/C and 0.2% titanium carbide (TiC)

The flexural strength is 1900 N/m² for K10 and 2000 N/m² for K20.

In the coatings specified, the individual compounds are applied in layers one after the other in the sequence specified from the inside outwards.

BRIEF DESCRIPTION OF THE DRAWINGS

An embodiment in accordance with the invention is described in more detail by way of example below, with reference to the figures, in which:

FIG. 1b: shows a side view of the milling machine in accordance with FIG. 1a,

FIGS. 13 and 14 show defined planes in the tool reference system.

FIGS. 18a–18f: show sections through the tool of the milling cutter head in accordance with FIG. 17, FIG. 19a: shows the insert of a web-cutting tip, viewed in the Y-direction.

DESCRIPTION OF THE PREFERRED EMBODIMENT

Figure 1A:
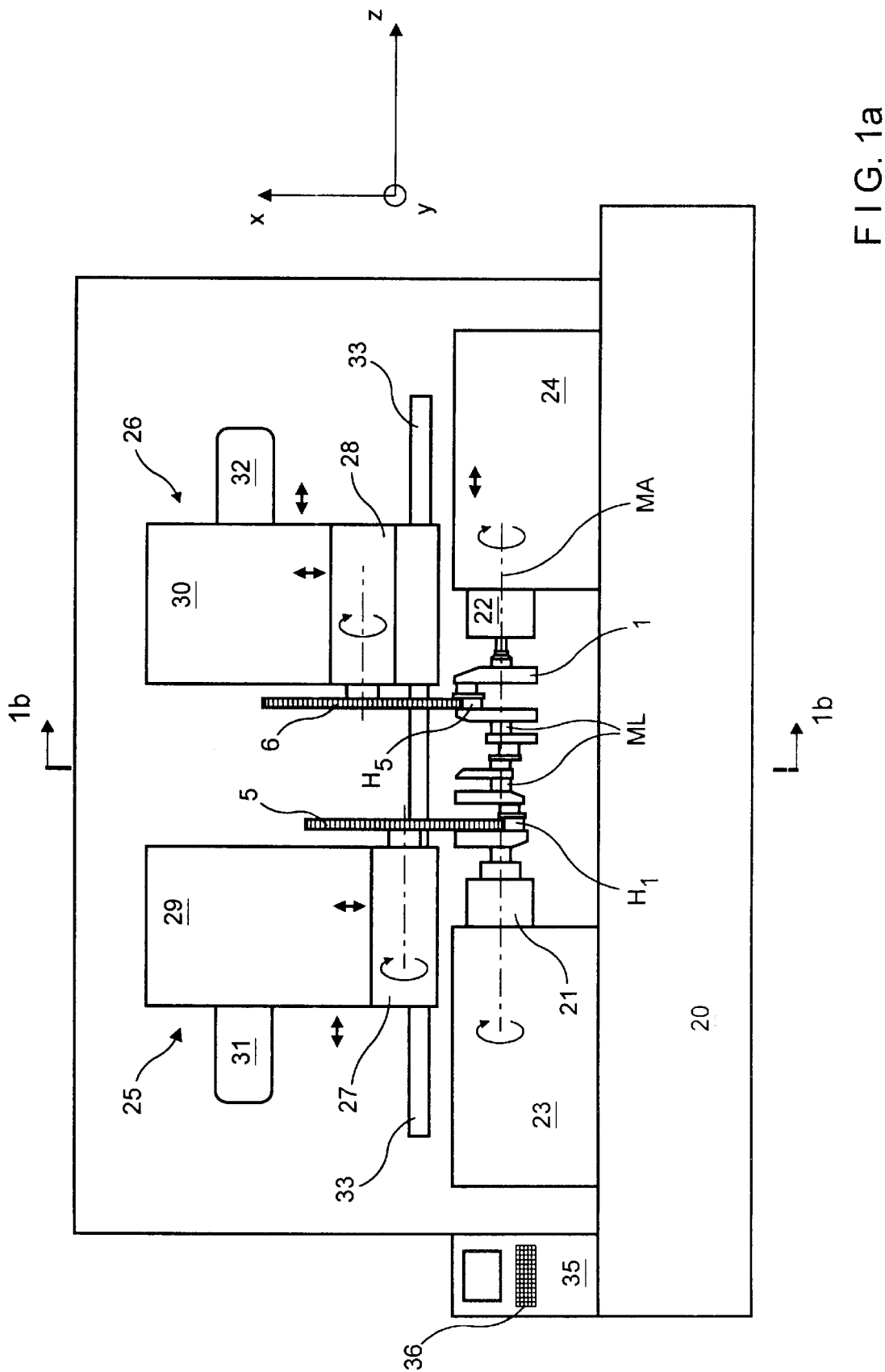
FIG. 1a: shows a front view of the milling machine.
Figure 1B:
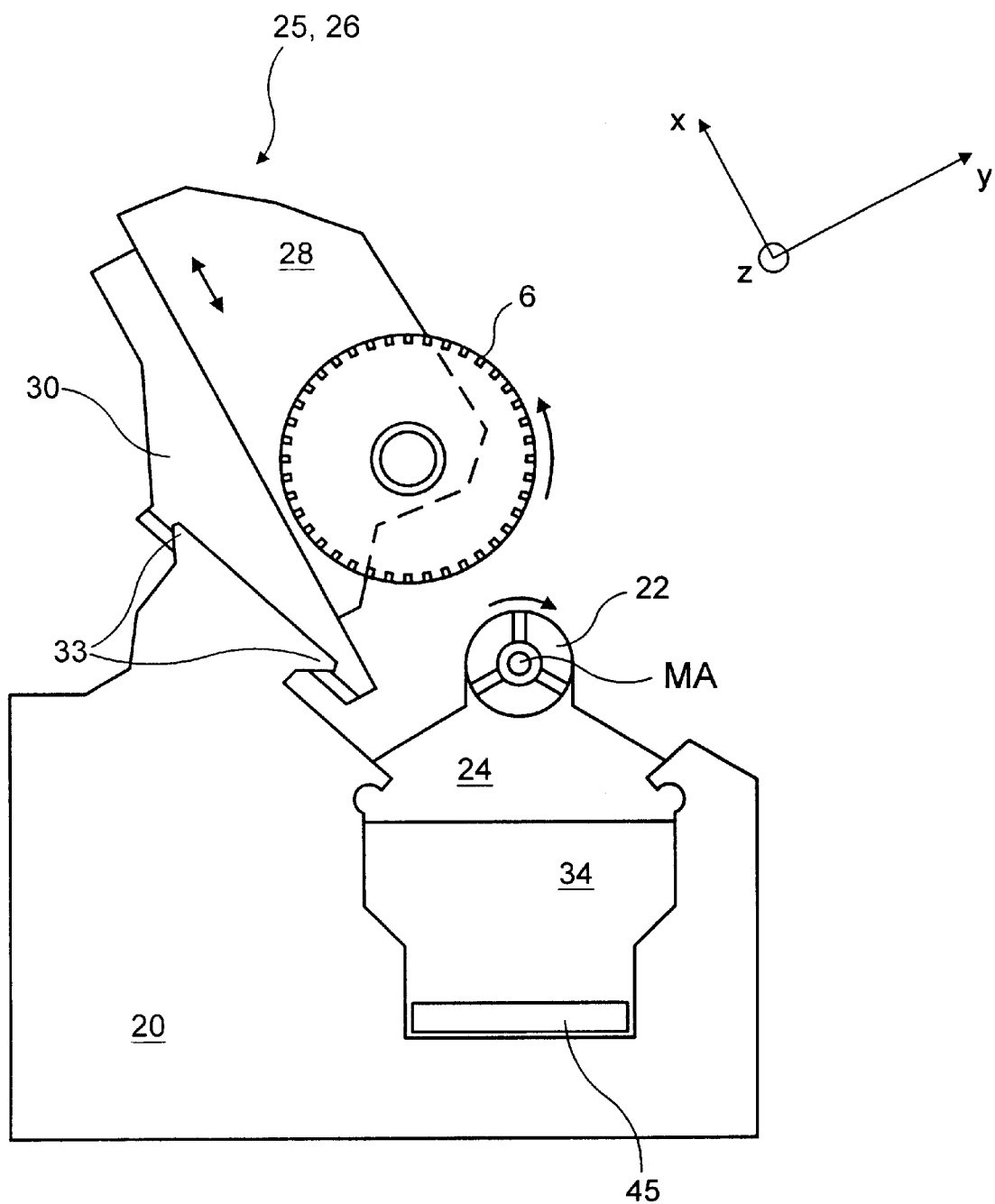

The milling machine illustrated in FIGS. 1a and 1b comprises a bed 20 with a chip trough 34 and a chip conveyor 45 accommodated therein. Two spindle heads 23, 24, which are spaced apart in the Z-direction and are directed towards one another, are positioned above the chip trough 34, at least one spindle head 24 being displaceable in the Z-direction.

The spindle heads in turn bear chucks 21, 22, which are directed towards one another, can be driven in rotation and are electronically synchronised with one another in terms of their rotation.

A crankshaft 1 is chucked in between the two chucks 21, 22, which crankshaft is chucked by the chuck 21 on its end flange and by the chuck 22 on its end journal, that is to say on the centre axis MA of the crankshaft 1, which thus coincides with the spindle-head axis. The belt surfaces, that is to say the circumferential faces on the end-bearing flange and on the end-bearing journal, have been rough-machined, in particular rough-machined with the removal of metal, and in addition corresponding stop faces have been rough-machined on the crankshaft for the purpose of inserting the crankshaft into the chucks in a defined rotational position.

Since the spindle heads 23, 24 not only drive the crankshaft in rotation but are also able to set its rotational position (C-axis formed), the crankshaft 1 chucked therein can at any time during the machining be brought into the desired rotational position, and moreover at a defined speed.

Viewed in the direction of FIG. 1a, Z-guides 33 are arranged on the bed 20 of the milling machine, behind the chip trough 34 and rising obliquely backwards out of the latter, on which Z-guides the lower slides 29, 30, which can be seen in FIG. 1a, of the tool slide rests 25, 26 can be displaced in the Z-direction.

On each of the lower slides 29, 30 there runs an upper slide 27, 28 which in each case supports a side-milling cutter 5, 6 such that it can be driven in rotation about an axis parallel to the Z-axis.

The upper slide 27, 28 can be moved from above in the X-direction onto the centre axis MA at a relatively steep gradient, at an angle of less than 45° to the perpendicular. The X-guides between upper slide 27, 28 and the lower slide 29, 30 here preferably coincides with the connection of the centre points of the side-milling cutters 5 and/or 6 and the centre axis MA.

In order to be able to use such a milling machine with an externally toothed side-milling cutter to machine the circumference of a crankpin journal H1, H2 over the entire circumference, the crankshaft 1 chucked on the centre axis MA must complete at least one full revolution during the machining.

As can best be understood with reference to FIG. 1a, during the rotation of the crankshaft 1 the side-milling cutters 5, 6 which are simultaneously in use at different machining locations are constantly guided on in the X-direction with the aid of the tool slide rests 25, 26.

As will be explained in more detail later, the movements of the two tool slide rests 25, 26 are thus indirectly dependent on one another, in that they depend on the rotation of the crankshaft which they are both machining and the geometry of the eccentric surfaces to be machined.

If in the process it is intended to carry out optimisations to the machining by means of these several slide rests which can be controlled independently of one another, for example with regard to a specific chip thickness, the side-milling cutters 5, 6 not only move differently in the X-direction but also rotate largely with different, constantly adjusted rotational speeds.

The milling cutters 5, 6, and also their slide rests 25, 26 and the machine control system which controls the joint rotation of the spindle heads, i.e. of the crankshaft 1, can additionally be recorrected by correction values using an input panel 36 on the machine, on the basis of the results, determined in practice, of the machining of the first components of a series of workpieces.

In FIG. 1b, the tool slide rests 25, 26, and thus also the directions of movement of the milling cutters 5, 6 and of the upper slides 27, 28, are aligned one behind the other in the direction of viewing.

Figure 2:
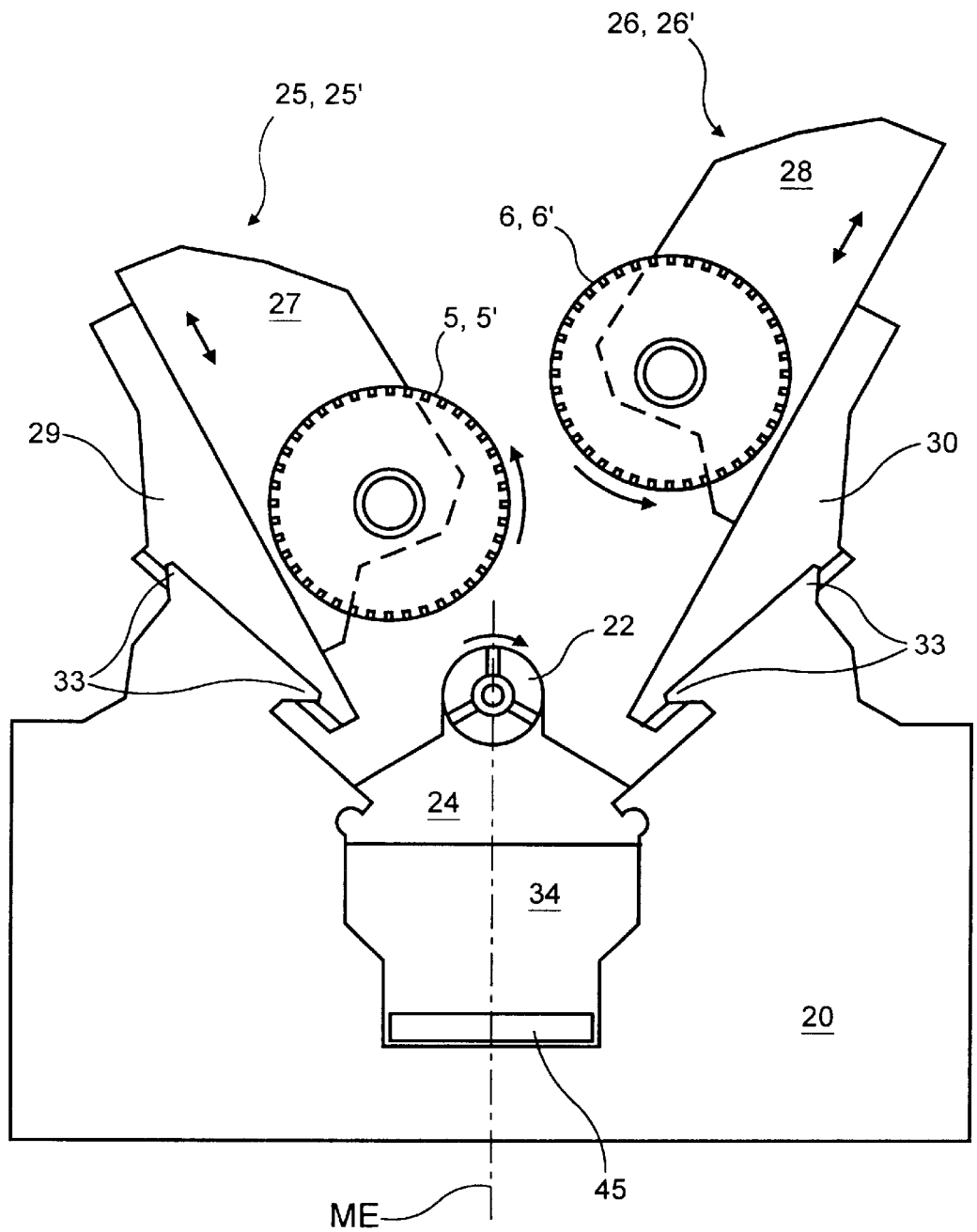
FIG. 2: shows a side view of another milling machine.

By contrast, FIG. 2 shows a different configuration of the machine in which, by contrast to FIG. 1b, the slide rests 25, 26, which are of similar design, are arranged in mirror-image fashion with respect to a centre plane ME, namely the vertical plane through the spindle-head axis. The directions of movement of the milling cutters 5, 6 in the X-direction towards the workpiece are thus positioned in a V-shaped manner with respect to one another.

Owing to the relatively large diameter of the milling cutters 5, 6, it is here possible for the milling cutters 5, 6 to operate simultaneously at different axial positions of the crankshaft, and in addition, in the direction of viewing of FIG. 2, the same tool slide rests 25', 26' may again be arranged behind the tool slide rests 25, 26, axially spaced apart. The fact that four side-milling cutters 5, 5', 6, 6' can then machine the crankshaft simultaneously permits optimally short machining times for crankshafts and similar parts.

Figure 3:
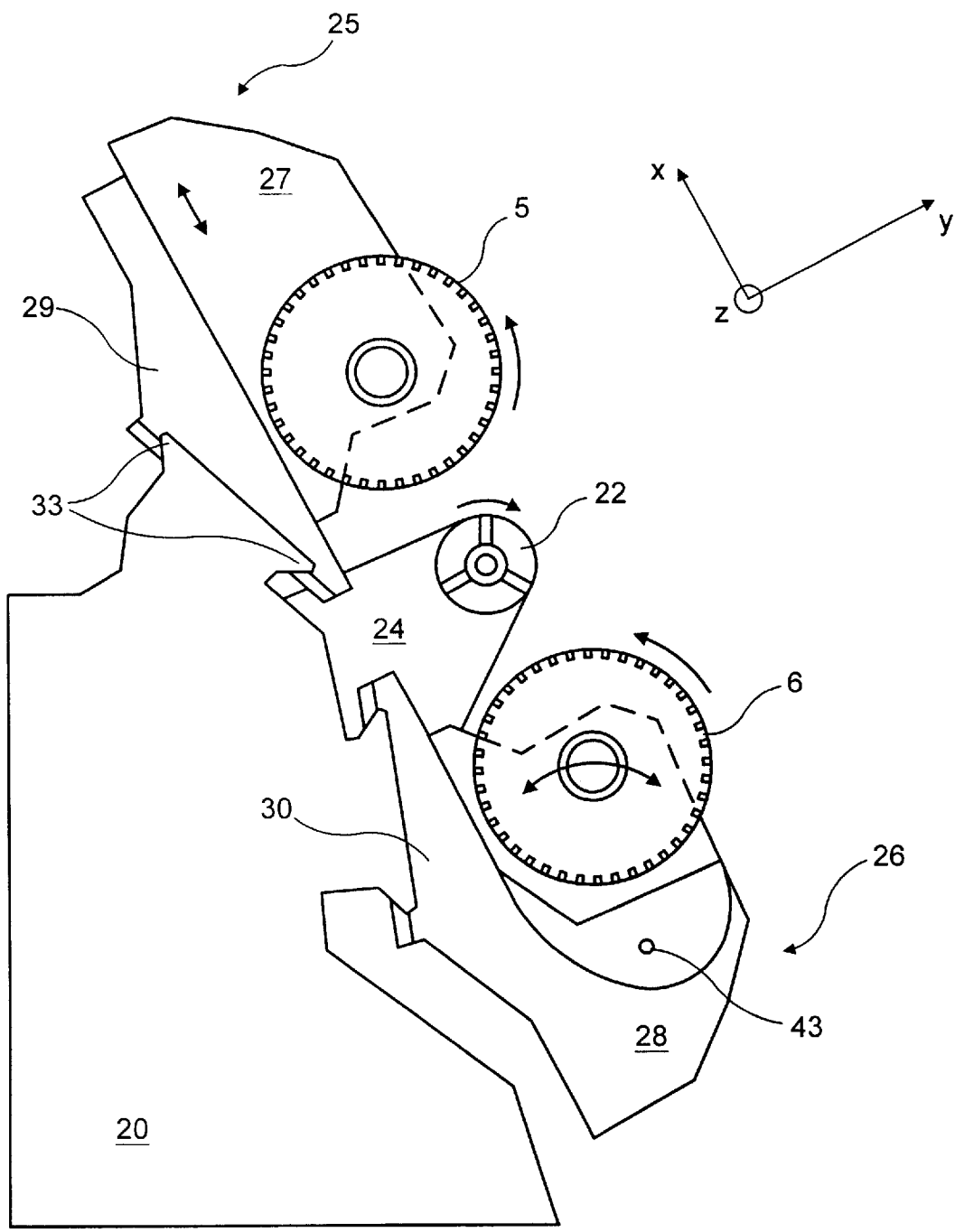
FIG. 3: shows a side view of a different solution.

Viewed in the same direction as FIG. 1, namely in the Z-direction, FIG. 3 shows another machine design, in which the slide rests 25, 26 act on the workpiece from opposite sides. The directions of movement of the two side-milling cutters 5, 6 are in this case on a line which runs through the spindle-head axis and are thus inclined just as much with respect to the perpendicular as the solution in accordance with FIG. 1b. On the inclined bed, one slide rest 25 is situated above the spindle heads 23, 24 and the other slide rest 26 is situated below the spindle heads 23, 24.

In this machine configuration too, in the direction of viewing of FIG. 3, identical slide rests may again be arranged behind the slide rests 25, 26, axially spaced apart, so that here too more than two, for example four or even six, milling cutters, which can be controlled independently of one another, can act on the workpiece.

Figure 4:
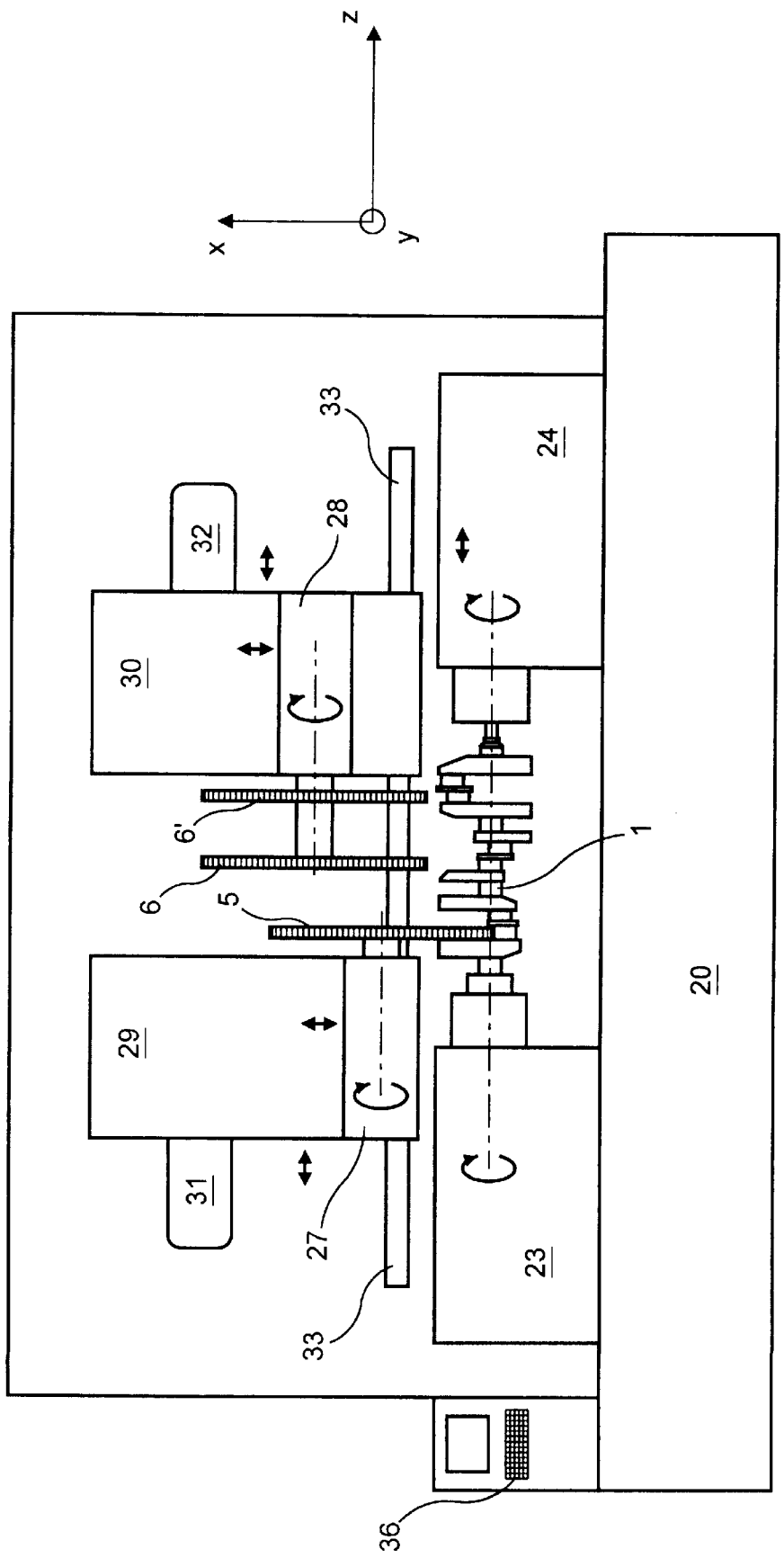
FIG. 4: shows a front view with a tandem tool.

FIG. 4 shows an illustration similar to that of FIG. 1a, but in which three side-milling cutters can be seen. However, two of the three side-milling cutters are coupled together to form a multiple tool 42, in that the two side-milling cutters, which are assigned to the tool slide rest 26, are connected to one another in an axially spaced but rotationally fixed manner and are driven jointly by this slide rest 26. It is thus possible to machine simultaneously machining locations which are aligned in the Z-direction, for example the second and third big-end journals of a crankshaft for a four-cylinder in-line engine.

The machine shown in FIG. 4 thus has three side-milling cutters, but only two milling units which can be driven independently of one another.

Figure 5:
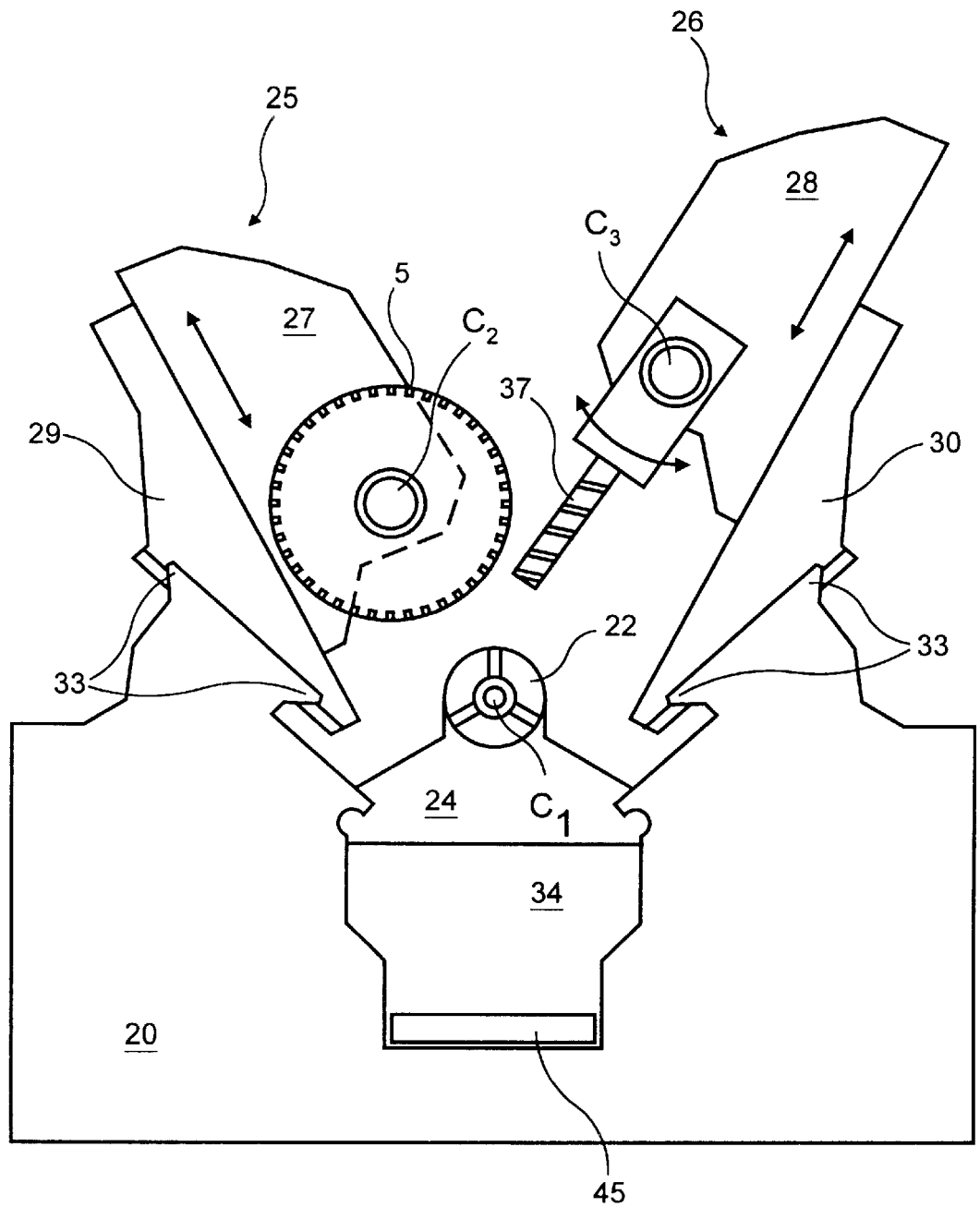
FIG. 5: shows a side view with a slotting cutter.

FIG. 5 shows a side view of a milling machine similar to that of FIG. 2. Here, the slide rest 25 is of identical construction to that in FIG. 2, that is to say it is equipped with a side-milling cutter 5 which can be driven in rotation about an axis which is parallel to the Z-direction, i.e. to the spindle-head axis.

In this case, the centre point of the side-milling cutter 5 moves in the X-direction, that is to say parallel to the X-guides between lower slide 29 and upper slide 27, on a plane which runs above the spindle axis. This results in a more compact structure of the milling machine owing to the tool slide rest being reduced in height.

In contrast to this, the tool slide rest 26, which like the slide rest 25 comprises a lower slide 30 and an upper slide 28, bears a slotting cutter 37, the axis of which runs transversely to the spindle-head axis. This slotting cutter 37 is mounted such that it can pivot in the upper slide rest 28 about an axis which is parallel to the Z-direction, that is to say to the spindle-head axis. As a result, it is possible to machine eccentric peripheral faces, for example to machine a crankpin journal of the centrically chucked crankshaft, in that during the slow rotation of the crankshaft the slotting cutter 37 is constantly guided on by pivoting with respect to the upper slide 28 and the traversed X-direction of the upper slide 28 with respect to the lower slide 30.

Instead of the traversing movement of the slotting cutter 37 with the upper slide 28 in the X-direction, an additional pivoting, i.e. virtually a pivoting of the upper slide 28 with respect to the lower slide 30, is also possible for compensation in the X-direction.

The machine depicted in FIG. 5 may, instead of being fitted with side-milling cutters and slotting cutters, also be equipped only with slotting cutters; this, incidentally, also applies to all other machine designs in accordance with the present invention.

Figures 6A, 6B:
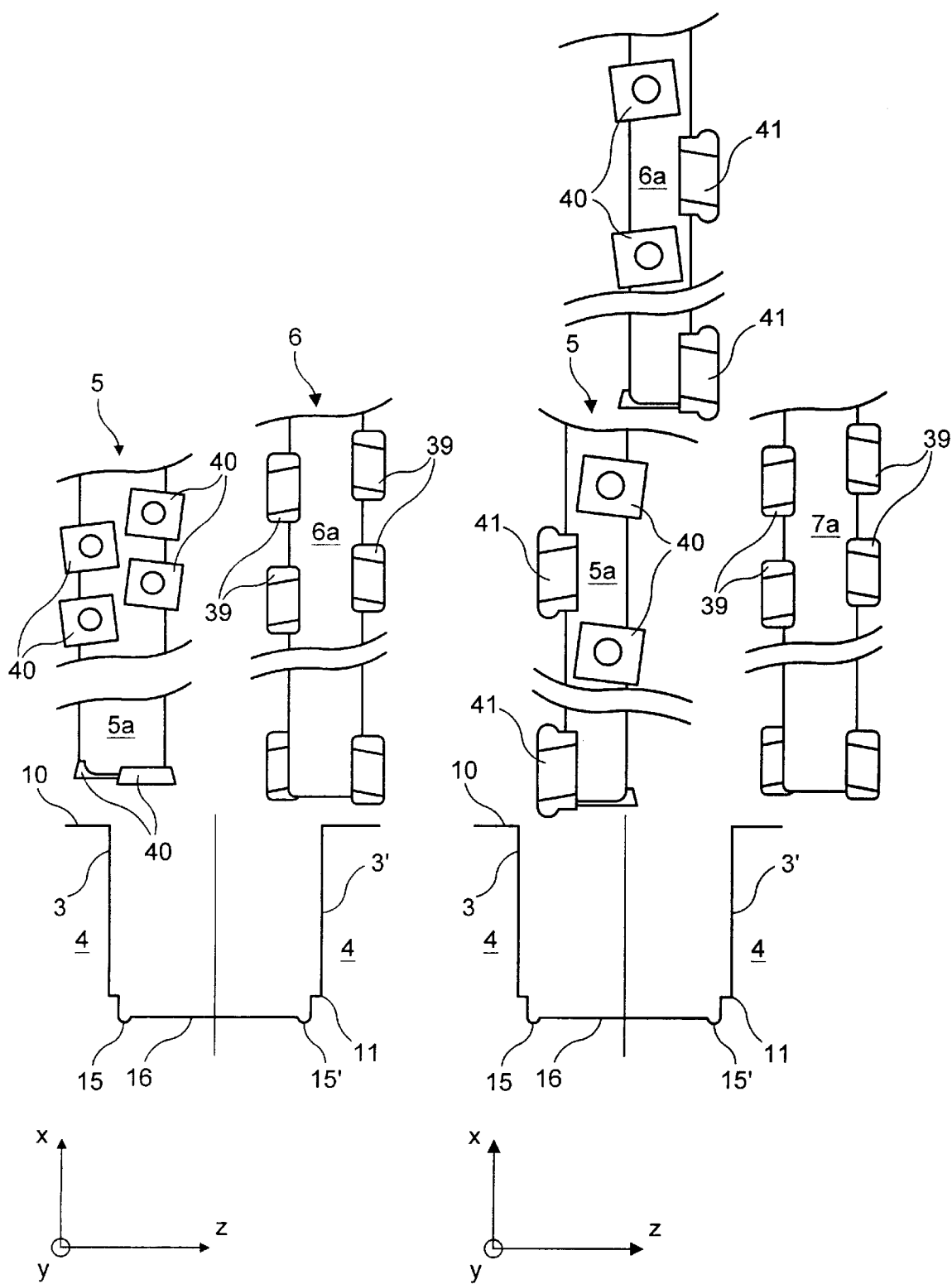
FIGS. 6a and 6b: shows detailed illustrations of side-milling cutters and the machining locations on a crankshaft.

FIG. 6 shows the surfaces which are typically to be machined on a crankshaft and the corresponding fitting of the base bodies 5a, 6a, 7a of the side-milling cutters 5, 6 with exchangeable cutting tips:

In FIG. 6a, the web-cutting tips 39 for machining web side faces 3 are arranged on both end faces of the cylindrical base body 6a of a side-milling cutter 6, the web-cutting tips 39 obviously also protruding radially beyond the base body 6a.

Due to the arrangement of the web-cutting tips on both sides of the base body 6a, it is possible to machine both left-hand and right-hand web faces 3 and 3'.

The arrangement of the web-cutting tips 39 on their own base body 6a is to be recommended, since owing to the high volume of metal removed from the web side faces 3, 3' these tips wear and have to be exchanged more quickly than, for example, the journal-cutting tips 40. In FIG. 6a, the latter are arranged on the circumferential face of a cylindrical base body 5a of a side-milling cutter 5 in two axially spaced apart paths which overlap in the Z-direction and on the respective outer side also protrude in the Z-direction beyond the base body 5a.

With such a side-milling cutter 5 which is exclusively fitted with journal-cutting tips 40, only peripheral faces, for example the journal face 16, are machined. Such a side-milling cutter 5 in accordance with FIG. 6a can also be used—by means of an additional controlled displacement of the side-milling cutter 5 in the Z-direction—to machine a journal face 16 which is significantly wider in the Z-direction than the width of the side-milling cutter 5. Due to the spiral machining path, annular shoulders between axially spaced-apart machining areas of a journal face 16 are avoided.

FIG. 6b shows another solution. In this figure too, the web-cutting tips 39 are arranged on their own base body 7a of a milling cutter. However, two separate side-milling cutters 5, 6 for the left-hand and right-hand halves, respectively, of the journal face are provided for machining the journal face 16 and the undercuts 15 which adjoin the latter on both sides:

In this case, journal-cutting tips 40 which are in each case arranged on the circumference are situated on the base body 5a and/or 6a, while undercut-cutting tips 41 for producing the undercut 15 or 15' are arranged on the end face of the base body, i.e. for the right-hand half in the +Z-direction and for the left-hand half in the –Z-direction. Obviously, in this case the undercut-cutting tips 41 again protrude radially beyond the base body 5a and/or 6a. The machining width of the two milling cutters 5, 6 in the Z-direction is in this case so great that in the centre of the journal the machined areas overlap. In order to avoid an annular shoulder here, in this case the journal-cutting tips 40 are designed to fall off slightly towards the centre of the bearing journal, i.e. they are chamfered or even rounded, in order in the centre of the bearing location to produce only a rounded elevation instead of a sharp shoulder.

The undercut-cutting tips 41, which are not shown in FIG. 6a, are in this figure arranged on a separate milling cutter, in order to produce the undercuts 15, 15' separately.

Figure 7:
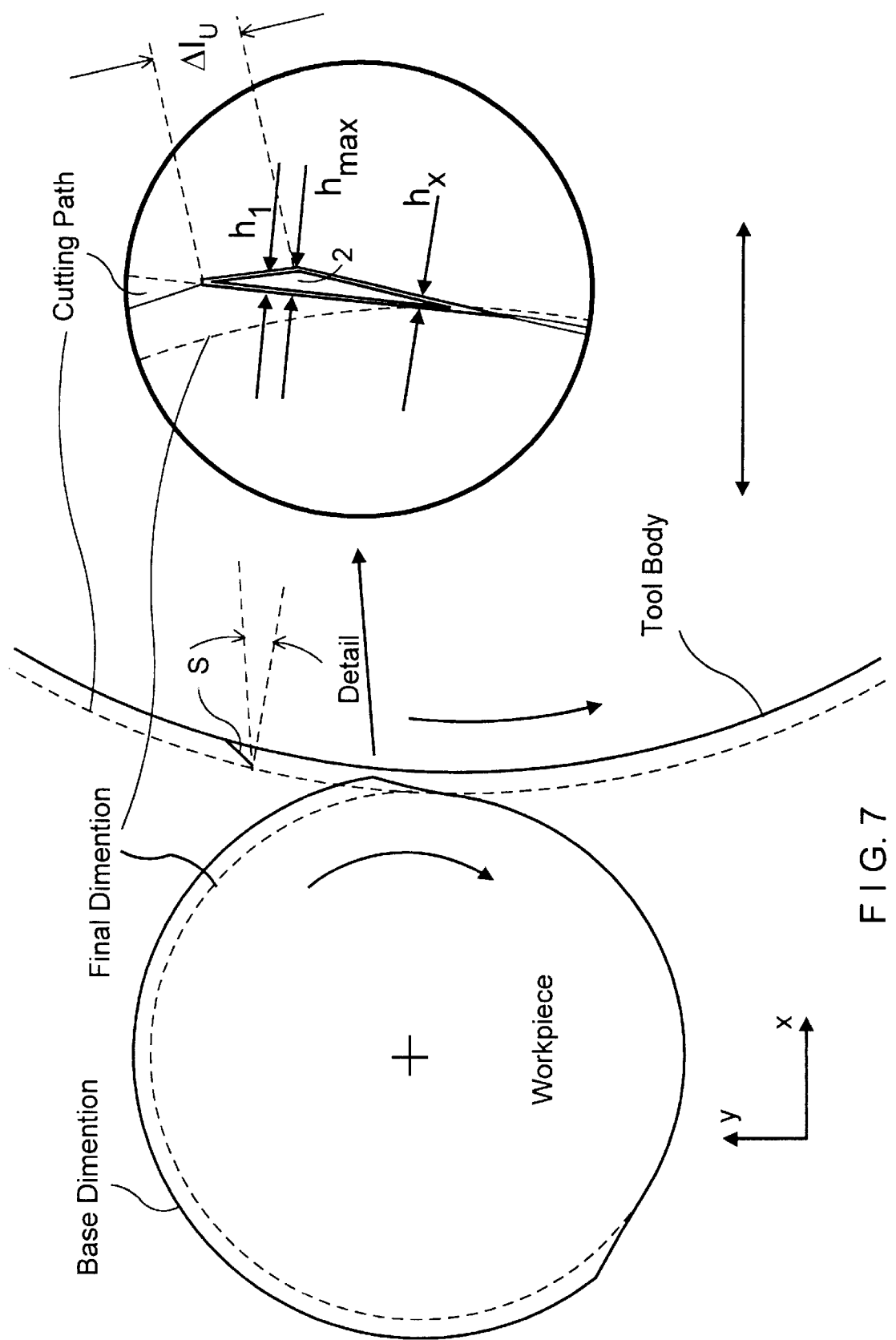
FIG. 7: shows a schematic depiction of climb-cutting external milling on a crankshaft journal.

In the direction of viewing of the Z-axis, FIG. 7 shows the fundamental situation for the machining of a circumferential surface, for example of the journal of a crankshaft, but also of an out-of-round circumferential surface, by means of external milling. An enlarged illustration of the machining point is depicted in the right-hand part of FIG. 7.

The workpiece is intended to be machined from the larger base dimension to the smaller final dimension.

In this case, the cutting edges S, only one of which is drawn in, protrude radially beyond the tool body, in order to be able to effect this abrasion. The tool body is in this case displaceable in a defined manner in the X-direction and rotates anticlockwise. Since the milling is intended to take place on a climb-cutting basis, the workpiece rotates in the clockwise direction, so that at the machining point tool and workpiece are moving in the same direction.

As shown by the enlarged depiction, the new cutting edge S will produce a chip 1, which is delimited in cross-section by two convex and one concave curved segments and has the form of a flat, irregular triangle.

In this case, the concave side is the flank produced by the preceding cut, and the long convex side is the flank produced by the the new cutting edge S. The short convex flank is the length $\Delta l_U$ measured along the circumference of the branch piece, that is to say the circumferential length between two successively arranged cutting edges of the tool striking the circumference of the workpiece.

In practice, of course, the chip 1 does not retain the shape which can be seen in FIG. 7, but rather is rolled up spirally owing to the deflection at the tool face of the cutting edge.

It can be seen from FIG. 7 that the chip thickness, e.g. $h_1$, of the chip 2—viewed in the passage direction of the cutting edge—increases rapidly up to the maximum chip thickness $h_{max}$. From there, the chip thickness decreases relatively slowly and continuously to the end (e.g. $h_x$).

If the difference between the base dimension and the final dimension remains the same and the rotational speed of the workpiece likewise remains the same, it can be seen from this illustration that a reduction in the rotational speed of the tool has the effect of increasing the cut distance $\Delta l_U$, and thus also of increasing $h_{max}$.

Figure 8:
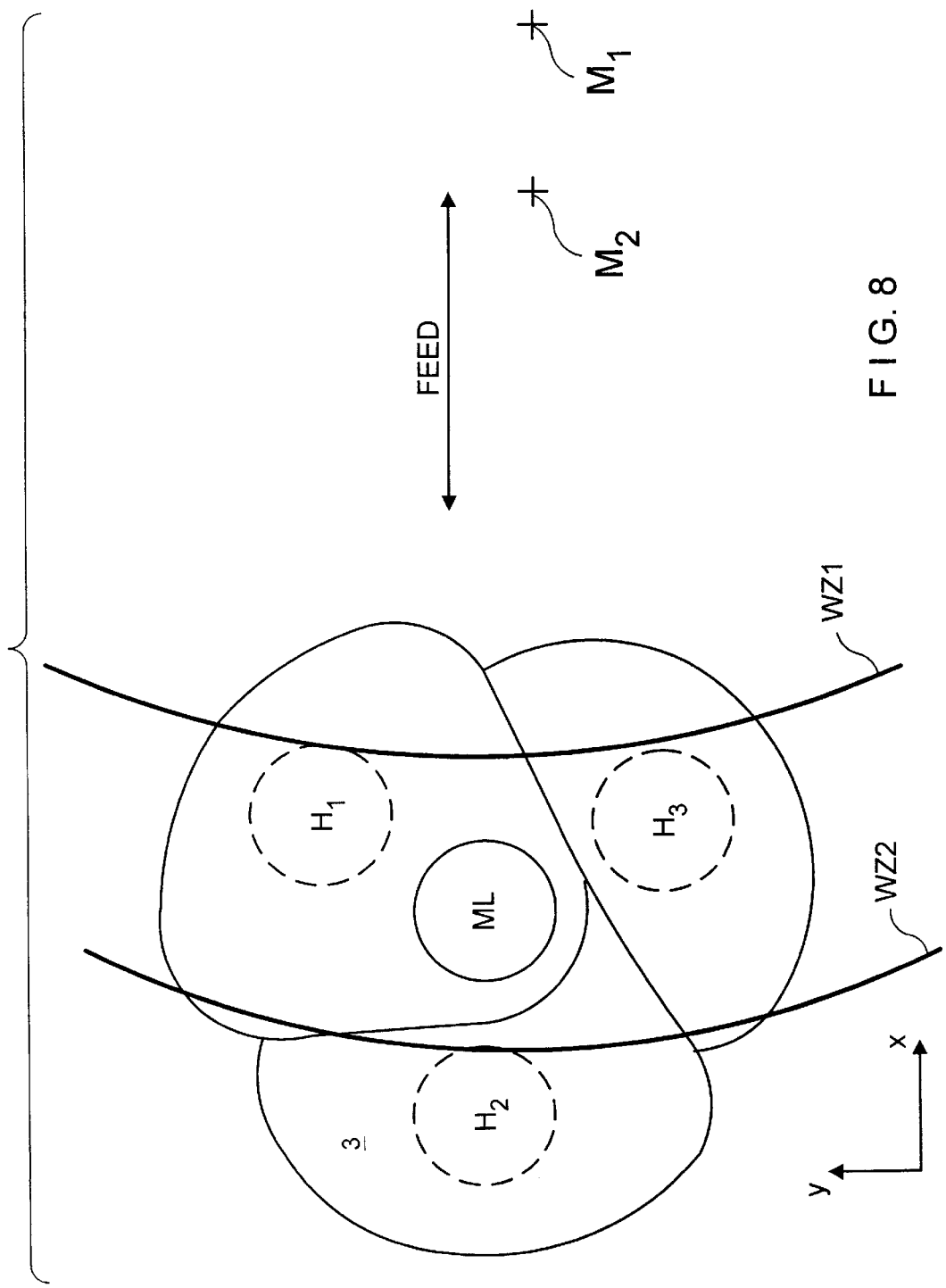
FIG. 8: shows a schematic depiction while simultaneously machining two different crankpin journals.

Again viewed in the Z-direction, FIG. 8 illustrates, for example, a crankshaft for a 6-cylinder in-line engine having three crankpin journals H1–H3 with different rotational positions with respect to the centre bearing ML.

Two separate tools, for example disc-like external-milling cutters (WZ1, WZ2), are being used on this crankshaft at different axial positions. One of the tools could, for example, machine the crankpin journal H1, and the other the crankpin journal H2, as illustrated in FIG. 8, but it would also be possible for one of the tools to machine a crankpin journal and the other of the tools to machine the end face of a web.

In the latter case, the machining of the web could in theory take place partially with the crankshaft stationary, in that the relevant tool WZ1 or WZ2 works along the end face of the web in the feed direction, that is to say in the X-direction. However, since if the crankshaft is stationary it is not possible to achieve any progress with the machining, taking place at a different axial position, of a peripheral surface, whether of a crankpin journal H or of a centre bearing ML, the machining of the web surface is preferably also carried out with the crankshaft rotating.

If the machining of the web starts in that position of the crankshaft which is illustrated in FIG. 8 and then the crankshaft rotates further, the result is the cutting paths $s_a$, $s_b$, $s_m$, $s_x$, some of which are drawn in FIG. 8.

As can be seen, these cutting paths, owing to the climb-cutting operation of the milling cutter, together with the rotation of the workpiece, are at a greater distance apart at the point where they begin than at the point where they end, that is to say the point at which the cutting edge leaves the side face of the web.

Figure 9:
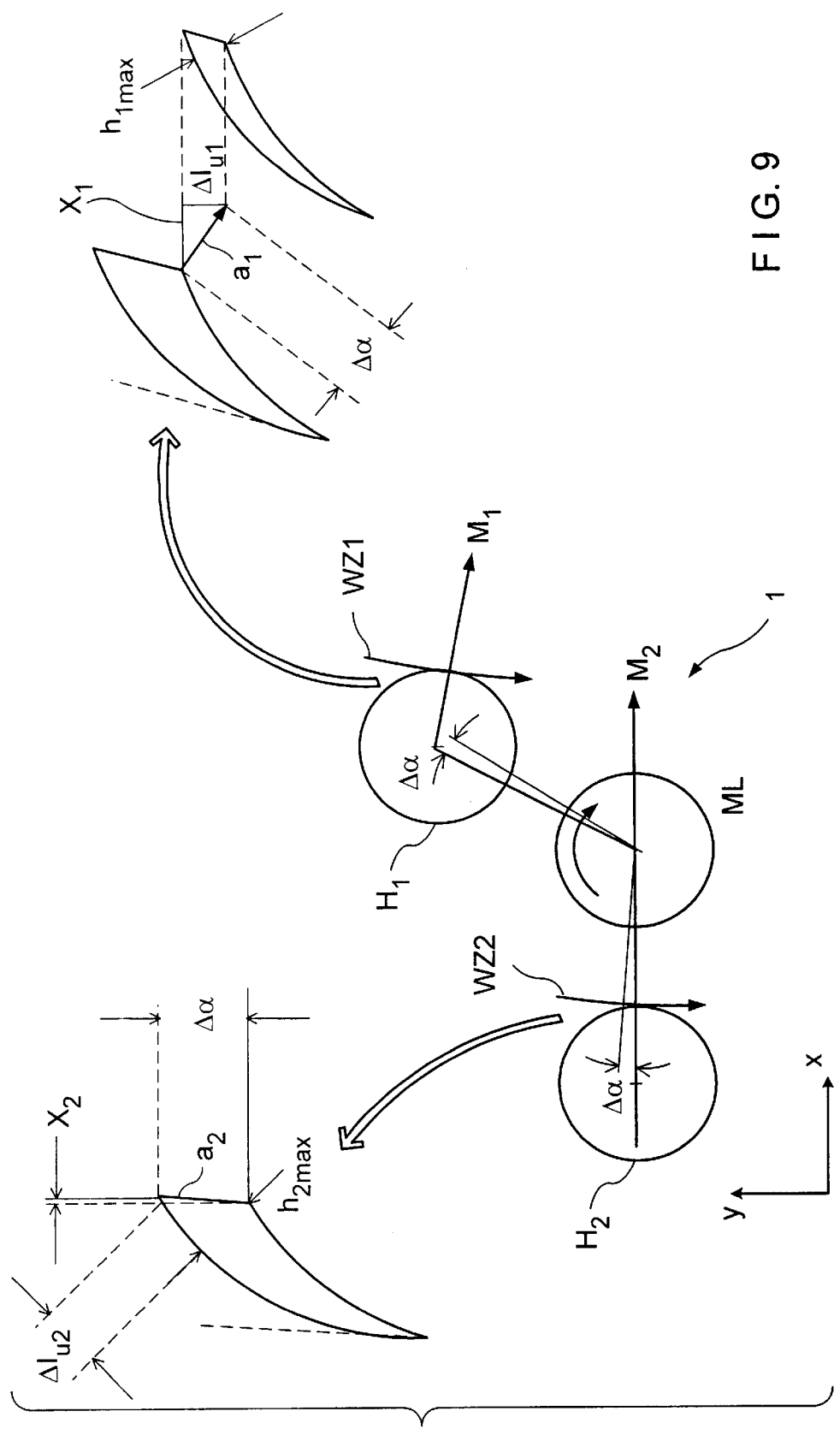
FIG. 9: shows detailed depictions of two different machining points.

FIG. 9 shows the relationships when two separate tools WZ1, WZ2 are simultaneously machining two different crankpin journals H1, H2. Independently of one another the tools WZ1 and WZ2 can move in a defined manner in the X-direction and their rotational speed can be controlled. However, the parameter which links them is the rotation of the crankshaft, as the workpiece, which is driven in rotation, likewise in a controlled manner, about the centre bearings, which rotation can also be stopped for certain machining operations.

In the situation illustrated in FIG. 9, crankpin journal H2 is situated in line with the centre bearing ML1 and the centre point $M_1$ and $M_2$ of the tools WZ1 or WZ2. The crankpin journal H1 is offset through about 120° in the clockwise direction with respect to the centre bearing.

If, as indicated, the tools WZ1 and WZ2 are each rotating anticlockwise and the crankshaft—as drawn in at its centre bearing ML—is rotating in the clockwise direction, the big-end journal H1 is clearly being milled by a climb-cutting method, which effect is desirable for the reasons given above.

For the big-end journal H2, one could gain the impression that it is subject to ordinary milling, since at this point the tool WZ2 is moving downwards but the crankpin journal H2 is moving upwards.

However, the absolute movement of the crankpin journal is not the deciding criterion in assessing whether ordinary or climb-milling is taking place, but rather the important factor is whether the big-end journal H2 is rotating about its own centre point allowing its surface at the machining point still to move in the same direction as the milling cutter.

However, viewed in absolute terms, the crankpin journal H2, which is migrating upwards in FIG. 9, is clearly rolling upwards along the tool WZ2, so that, therefore, the big-end journal is rotating in the clockwise direction relative to the centre point of the big-end journal H2 and therefore de facto climb-cutting is the prevailing circumstance at the machining point.

FIG. 9 furthermore shows the relationship which is necessarily present between the machining on the two big-end journals H1 and H2, which relationship is to be taken into account primarily in optimizing a plurality of machining operations which take place simultaneously with regard, for example, to a specific chip thickness.

It has been assumed that the milling cutter WZ2 in relation to the crankshaft 1—of which only the centre bearing ML and the two crankpin journals H1 and H2 currently being machined are shown in FIG. 9, for the sake of clarity—are rotating so quickly with respect to one another that the crankshaft has been rotated further through the angle $\Delta\alpha$ between the engagement of two successive cutting edges of the tool WZ2 on the big-end journal H2. Since in FIG. 9 the centre point of the big-end journal H2 and the centre point of the crankshaft, that is to say of the centre bearing ML, are in line with the centre M2 of the tool WZ2, the pivot angle $\Delta\alpha$ provides an offset $a_2$ of the point where the new cutting edge strikes with respect to the old cutting edge, which runs almost precisely in the Y-direction.

As a result, it is only necessary for there to be a very small X-component $x_2$ by means of a corresponding X-movement of the tool WZ2, and the resultant cutting distance $\Delta I_{U2}$ determines a chip cross-section, the thickness of which is intended to correspond to the optimum chip thickness.

It is also intended, as far as possible, for the same chip thickness to be achieved at the machining point of the crankpin journal H1. Assuming that the rotational speed and diameter of the tools WZ1 and WZ2 are the same, the centre point of the crankpin journal H1 has also been pivoted through the angle $\Delta\alpha$ with respect to the centre of the big-end journal by the time that the next cutting edge of the tool WZ1 comes into action.

The offset $a_1$, thus brought about at the machining point is in this case greater to only a negligible extent than $a_2$, since the distance from the centre of the centre bearing ML to the machining point on the big-end journal H1 is slightly greater than the distance to the centre of the big-end journal $H_1$. This offset $a_1$ has a pronounced component $x_1$ in the X-direction, which component has to be compensated for by a corresponding movement of the tool WZ1 in the X-direction. Thus only a relatively small component of $a_1$ remains as the cutting distance $\Delta I_{U1}$ in the Y-direction. This would result in the thin chip, which is illustrated to the outside on the right-hand side in FIG. 9, with a maximum thickness of only $H_{1max}$, which is much smaller than the optimum chip thickness.

In order to reach the optimum chip thickness at this machining point too, the rotational speed of the tool WZ1 has to be reduced by comparison with the rotational speed of WZ2, so that the cutting distance $\Delta I_{U1}$ increases to such an extent that the desired chip thickness is also achieved on the crankpin journal $H_1$. It is necessary here to reduce the rotational speed of tool WZ1 to a maximum of about 30% of the rotational speed of tool WZ2.

In addition to the first optimization target described of a specific—average or maximum—chip thickness, the secondary optimization target could be a cutting speed which is intended to move within a predetermined target corridor or is intended not to exceed a specific maximum value.

In the former case, this would lead, in the case of the machining illustrated in FIG. 9, to the rotational speeds of the workpiece and of the tool WZ2, during the machining of the big-end journal H2, being increased with respect to one another—such that the desired chip thickness is maintained on the big-end journal H2, to such an extent that the rotational speed of tool WZ2 moves at the upper end of the specified range for the cutting speed. This also results in an increase in the rotational speed of the tool WZ1, as a result of which the cutting speed on the crankpin journal $H_1$ should likewise still lie within the specified range for the cutting speed.

By contrast, if an upper limit is specified for the cutting speed, this upper limit would be applied to the machining on the crankpin journal $H_2$, which has the higher cutting speed by comparison with the machining on the crankpin journal $H_1$, so that, as a result, an absolute upper limit of the cutting speed is automatically observed at both machining points present.

In the event of more than two points on a crankshaft being machined simultaneously, in an analogous manner the limiting criterion for absolute maximum or minimum values is always to be applied to the machining point which has the relatively highest or lowest corresponding value.

When specified ranges of certain cutting parameters are being applied, it may be that it is not possible to observe this range for all the machining points. In this event, either the specified range width should be increased or a third-priority optimization parameter has to be specified. This third optimization variable could, for example, be the chip length (primarily in the case of the machining of web side faces).

Figure 10:
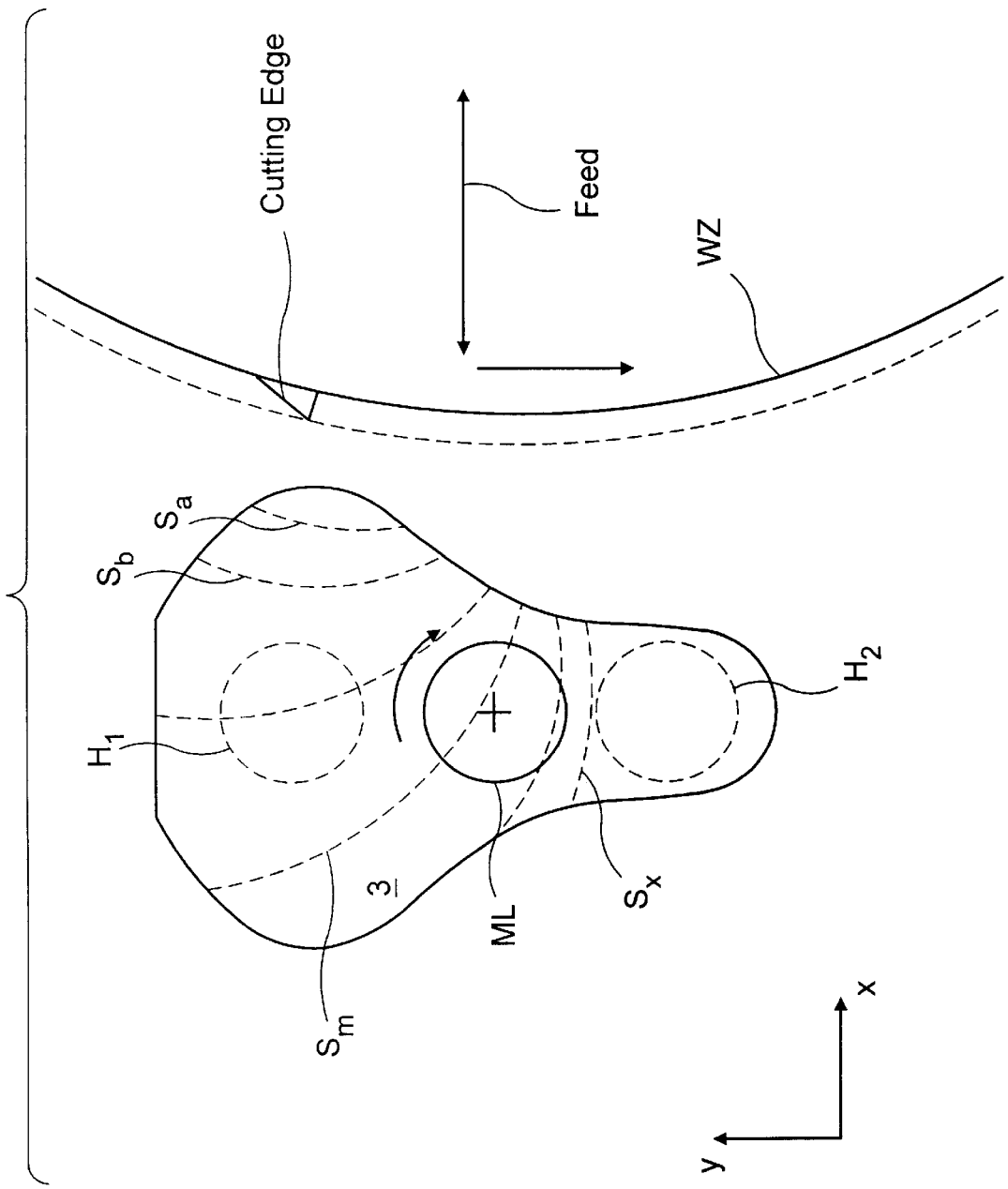
FIG. 10: shows a curve of motion during the machining of a journal.

The mutual dependencies illustrated in FIG. 9 when observing a specific chip thickness occur to an increased extent when one of a plurality of simultaneous machining points on the crankshaft is the machining of an end face of a web, as illustrated in FIG. 10. The illustration in FIG. 10 shows a crankshaft, for example for a four-cylinder in-line engine, in which the crankpin journals H1 and H2 are situated opposite one another, in the radial direction, with respect to the centre bearing ML.

If, in the position illustrated in FIG. 10, one were to begin machining the web surface 3 by means of the tool WZ, the crankshaft would rotate further in the direction indicated (in the clockwise direction) about the centre of the centre bearing ML, while the tool WZ is rotating anticlockwise, in order to bring about climb-cutting milling.

Some of the resultant cutting paths $s_a$, $s_b$, $s_m$, $s_x$ are drawn in on the web surface 3.

The simultaneous rotation of the crankshaft results in chip cross-sections which are again considerably larger at the start of the chip than towards the end of the chip, and in addition the chips differ considerably in their length, depending on the respective position of the cutting path on the web surface 3.

As a rule, it is not possible to dispense completely with a rotation of the crankshaft, since otherwise a machining operation, currently taking place at a different point of the crankshaft, on a bearing journal would no longer produce any progress in the machining.

Therefore, if, on a crankshaft, a plurality of web side faces or one web side face takes place at the same time as the machining of a bearing journal, the discrepancies in chip thicknesses between the various machining points, given identical rotational speeds and diameters of all the tools, which discrepancies were illustrated with reference to the example of FIG. 9, occur to an increased extent, so that it is necessary to an increased extent for the rotational speeds, and/or in the case of the machining of a web also the movement in the transverse direction, that is to say the X-direction, by the milling cutter, to be adjusted continually, in order to observe the desired optimum chip thickness in each phase of the machining and at all the machining points at the same time.

Figure 11:
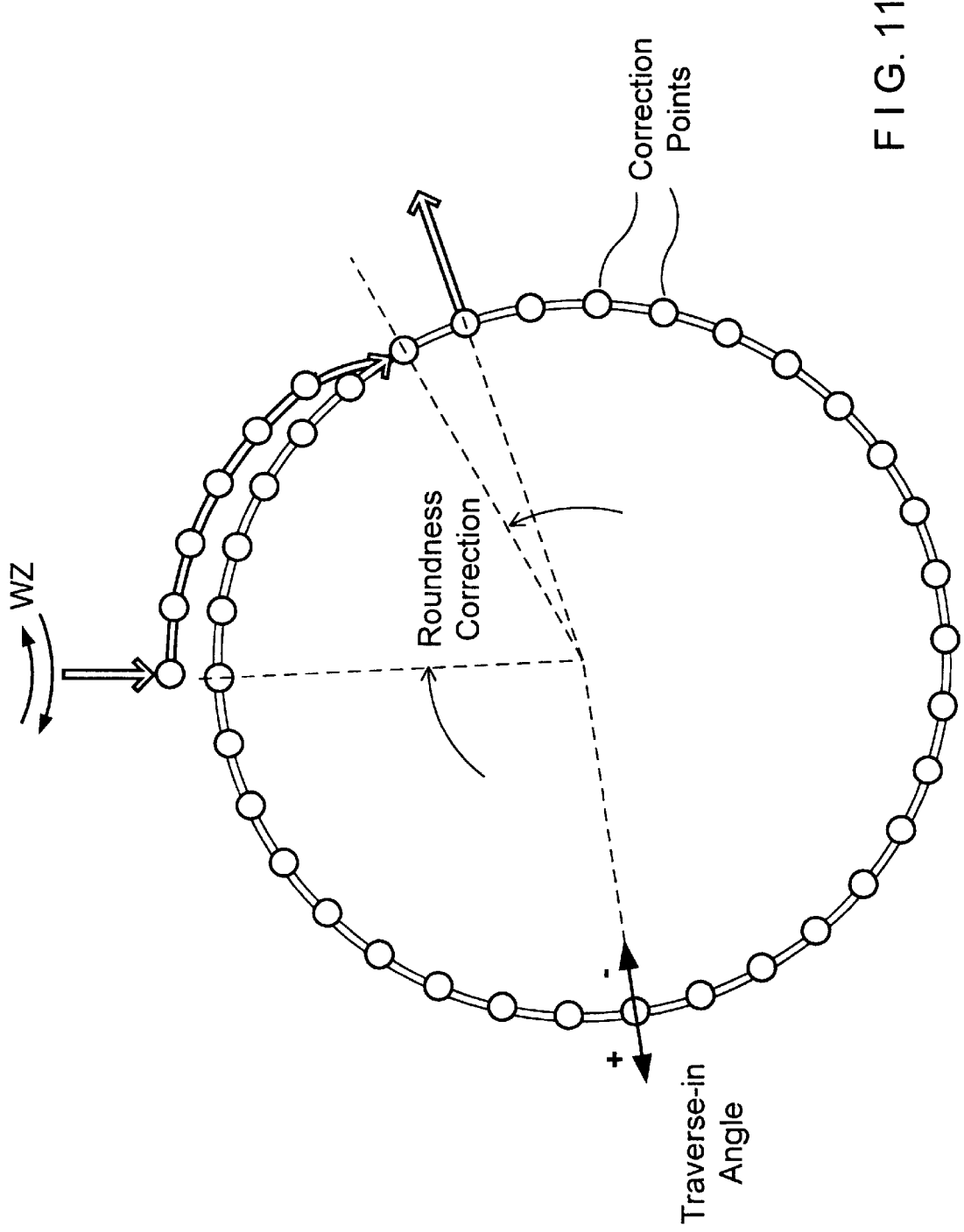
FIG. 11: shows a depiction of the curve of motion during the milling of a journal.

As shown by FIG. 11, in order to protect the workpiece, the procedure is as follows even at the start of the machining of the peripheral surface, for example of a bearing journal:

Despite the rotation of the workpiece, the milling cutter is fed in relatively slowly as far as the desired radial dimension. A radial in-feed which is too quick would not only increase the chip thickness to unacceptable levels but also, above all, the corollary transverse forces which are introduced into the workpiece would become relatively high, due to the chip length, which is then considerable owing to the relatively great wrap between a disc-like external-milling cutter, which rotates about an axis parallel to the bearing-journal axis, and the current machining point.

As shown by FIG. 11, the milling cutter is moved forwards radially towards the centre point of the bearing journal to be machined so slowly that the existing extent is acted on by the milling cutter only after a traverse-in angle of about 50–70, preferably about 60°, of the bearing-journal circumference. Starting from this point, it is necessary to execute a complete revolution of the bearing journal to be machined, and preferably slightly more, that is to say about 370°, in order to achieve optimum adaptation of the actual contour to the desired contour of the journal. The milling cutter can then traverse directly radially outwards.

In addition, in FIG. 11 correction points with an intervening angle of about 10–15° with respect to the centre point of the crankpin journal to be machined are arranged along the machining path.

After producing the first components of a series to be machined, the extent to which the actual circumferential contour approaches the desired circumferential contour can be measured and the actual contour achieved can subsequently be corrected empirically by modifying each of the individual correction points, by entering corresponding correction values for the individual correction points into the machine control system.

Furthermore, in FIG. 10 the circumferential contour of the web is flattened off at one point in a planar manner. The circumferential contour of the web surface is also partially machined by means of external milling. The external milling according to the invention makes it possible—by means of a corresponding control of the rotational position, that is to say of the rotational speed of the crankshaft in relation to the X-displacement of the milling cutter—not only to achieve any desired (that is to say outwardly curved) contour, but also to achieve planar flattened portions which lie, for example, tangentially with respect to the centre bearing ML of the crankshaft. Planar milled areas of this kind are required either for the subsequent attachment of, for example, counterweights, or else for balancing the crankshaft directly in the chucking of the metal-removing machining operation.

It is even possible to produce concave, that is to say recessed, circumferential contours, as long as the radius of curvature thereof is greater than the radius of the disc-like external-milling cutter.

Figure 12:
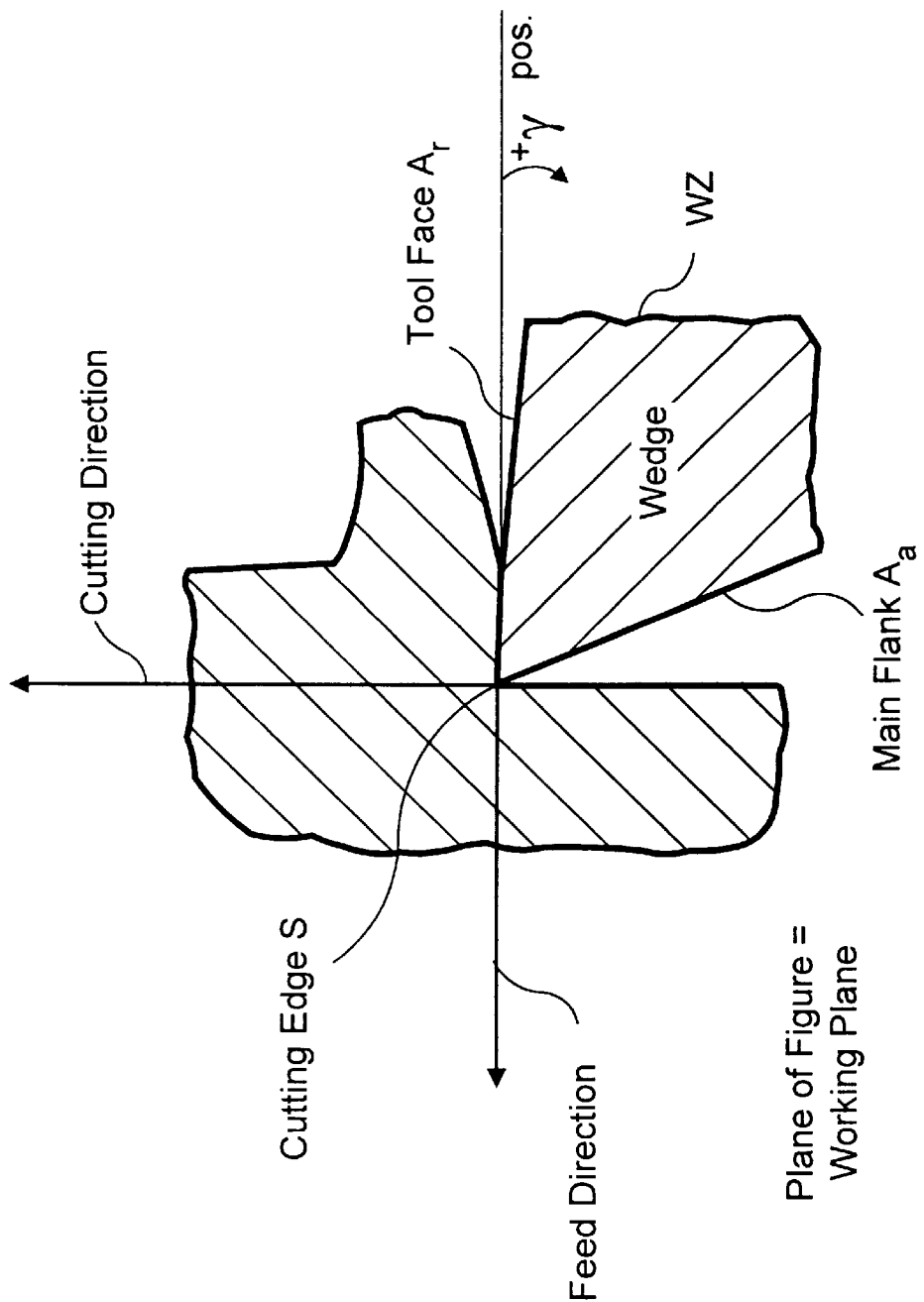
FIG. 12: shows a schematic depiction of the wedge of the tool.

FIG. 12 shows a section through a metal-removing tool WZ, for example a turning tool, most designations and angles applying both to turning and to milling. Here, the cutting edge, for example the main cutting edge S, is formed by the edge formed by the tool face $A_\gamma$ and the main flank $A_\alpha$, and the secondary cutting edge S' is formed by the tool face $A_\gamma$ and the secondary flank $A'_\alpha$ running at an angle to the main flank $A_\alpha$. The cutting edge S, which in FIG. 12 is shown as a sharp edge, is in practice never completely sharp, but rather has to have a certain degree of rounding, the cutting edge rounding (CER), in order to prevent the cutting edge chipping.

Figure 13:
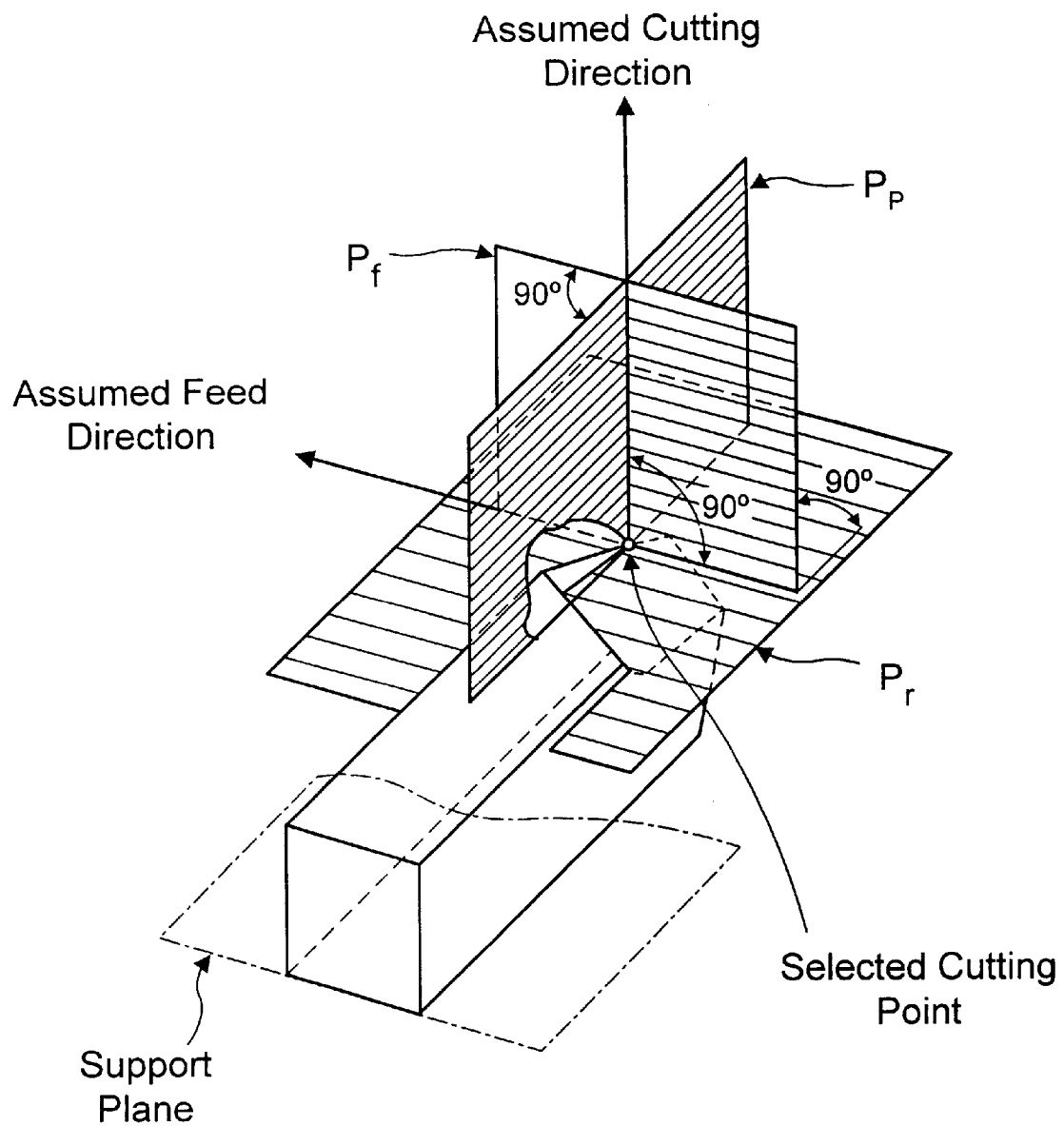

Various directions and planes with respect to the tool are defined in FIGS. 13 and 14.

In these Figures, the tool reference plane $P_r$ is a plane through the selected cutting-edge point, specifically perpendicular to the assumed cutting direction. The tool reference plane $P_r$ is in this case as far as possible selected such that it lies parallel or perpendicular to an axis of the tool. It has to be stipulated individually for each type of tool. In the case of turning tools, the tool reference plane $P_r$ is a plane parallel to the base of the shank for conventional turning tools, while in the case of milling tools it is a plane which contains the axis of the milling tool.

The assumed working plane $P_f$ is a plane through the selected cutting-edge point, perpendicular to the tool reference plane $P_r$ and parallel to the assumed feed direction.

The tool rear plane $P_p$ is a plane through the selected cutting-edge point, perpendicular to the tool reference plane $P_r$ and perpendicular to the assumed working plane $P_f$. $P_r$, $P_p$ and $P_f$ thus form a coordinate system through the assumed cutting-edge point.

The tool cutting-edge plane $P_s$ (see FIG. 14) is a plane through the cutting-edge point, tangential with respect to the cutting edge S and perpendicular to the tool reference plane $P_r$. If the tool cutting edge S is at right angles to the feed direction, tool cutting edge plane $P_s$ and tool rear plane $P_p$ coincide.

The tool orthogonal plane $P_c$ is a plane through the cutting-edge point, perpendicular to the tool reference plane $P_r$ and perpendicular to the tool cutting-edge plane $P_s$. Therefore, if the tool cutting edge S is at right angles to the feed direction, tool orthogonal plane $P_c$ and assumed working plane $P_f$ coincide.

Figure 15:
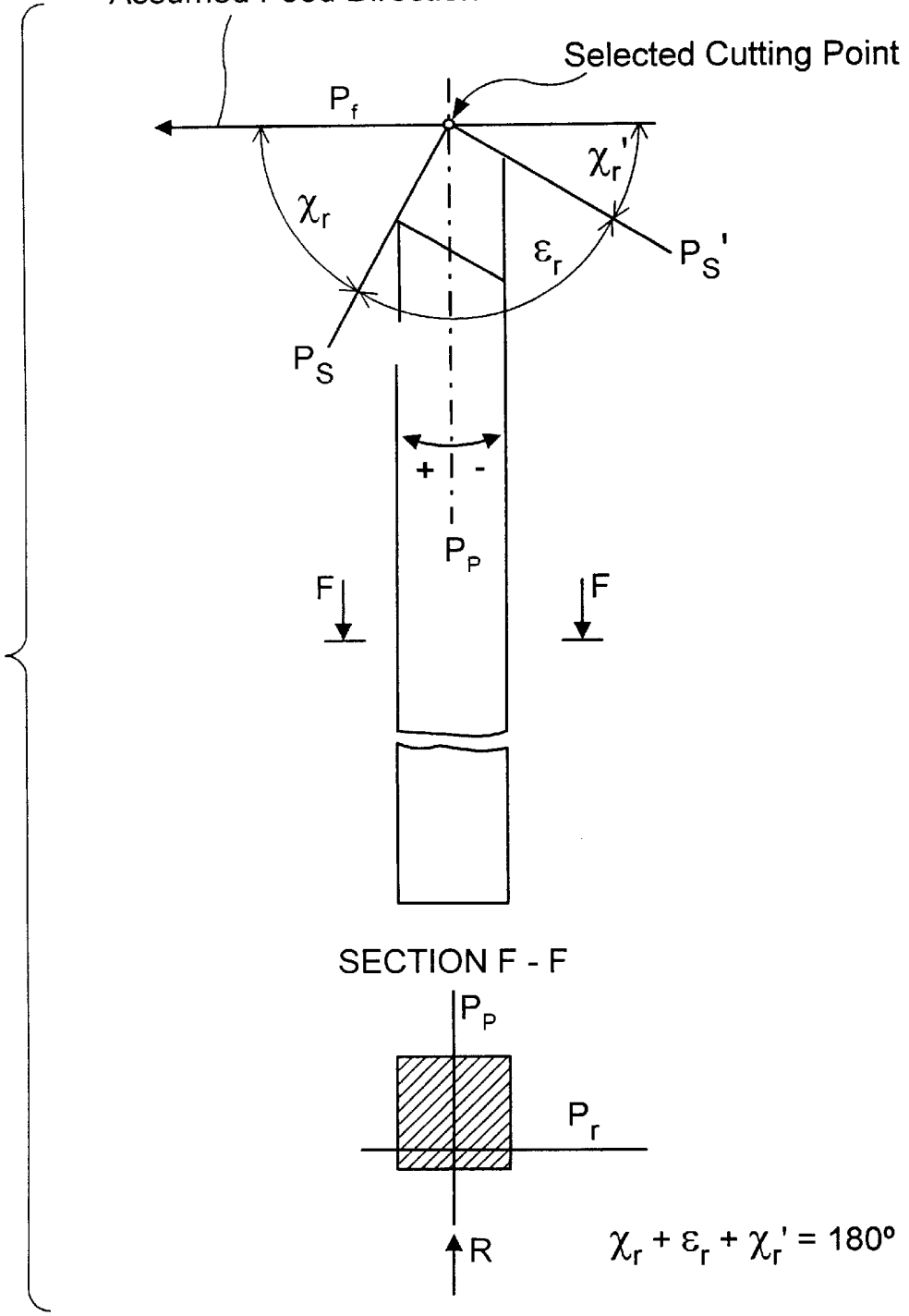
FIGS. 15 and 16 show the angular position of the cutting edge in the tool reference system, using the example of a turning tool for plain turning (FIG. 15) and face turning (FIG. 16).
Figure 16:
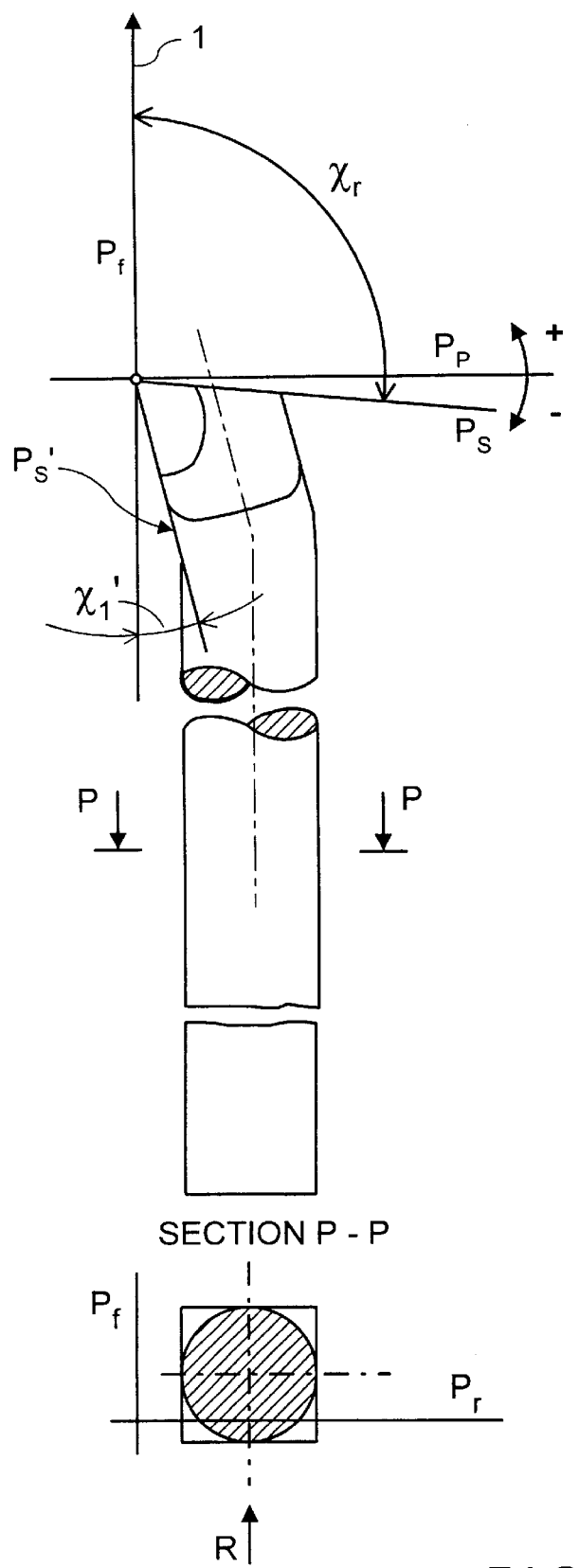
Figure 17:
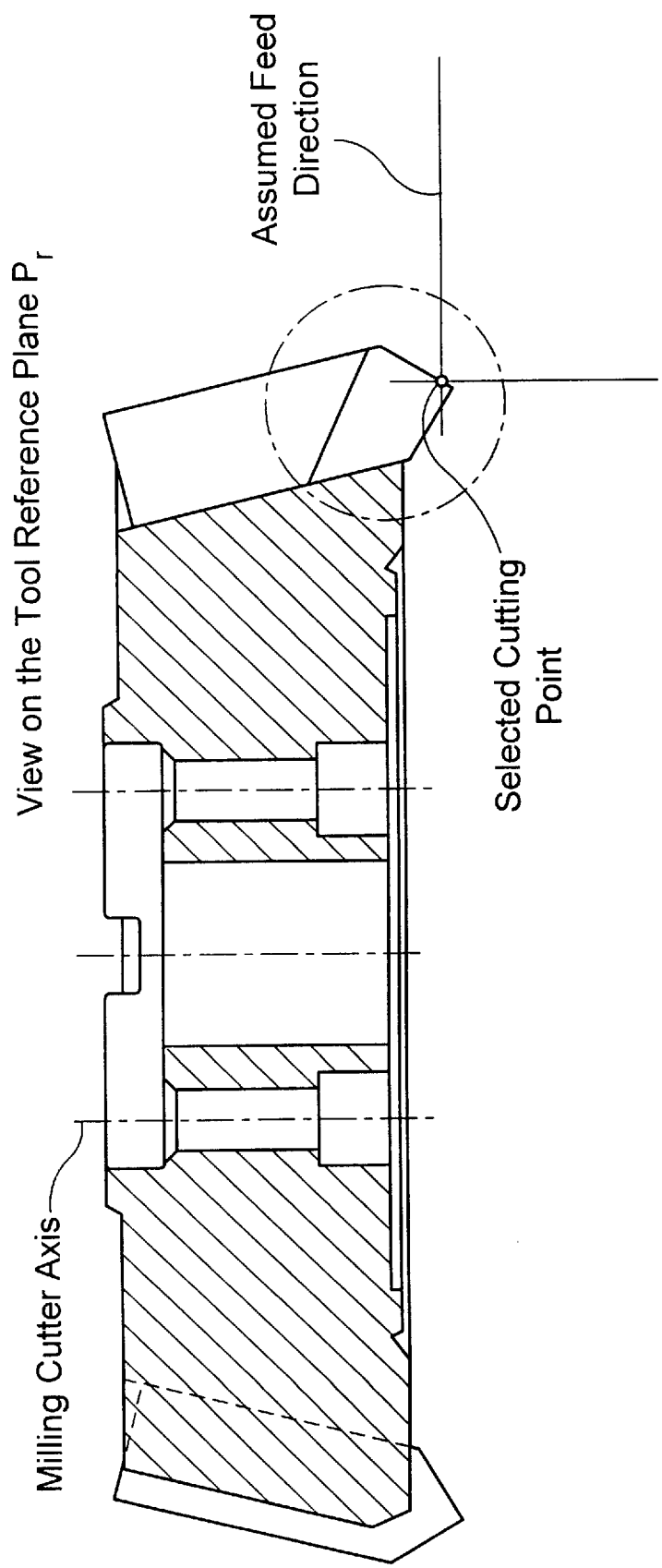
FIG. 17: shows a section through a milling cutter head.
Figure 18A:
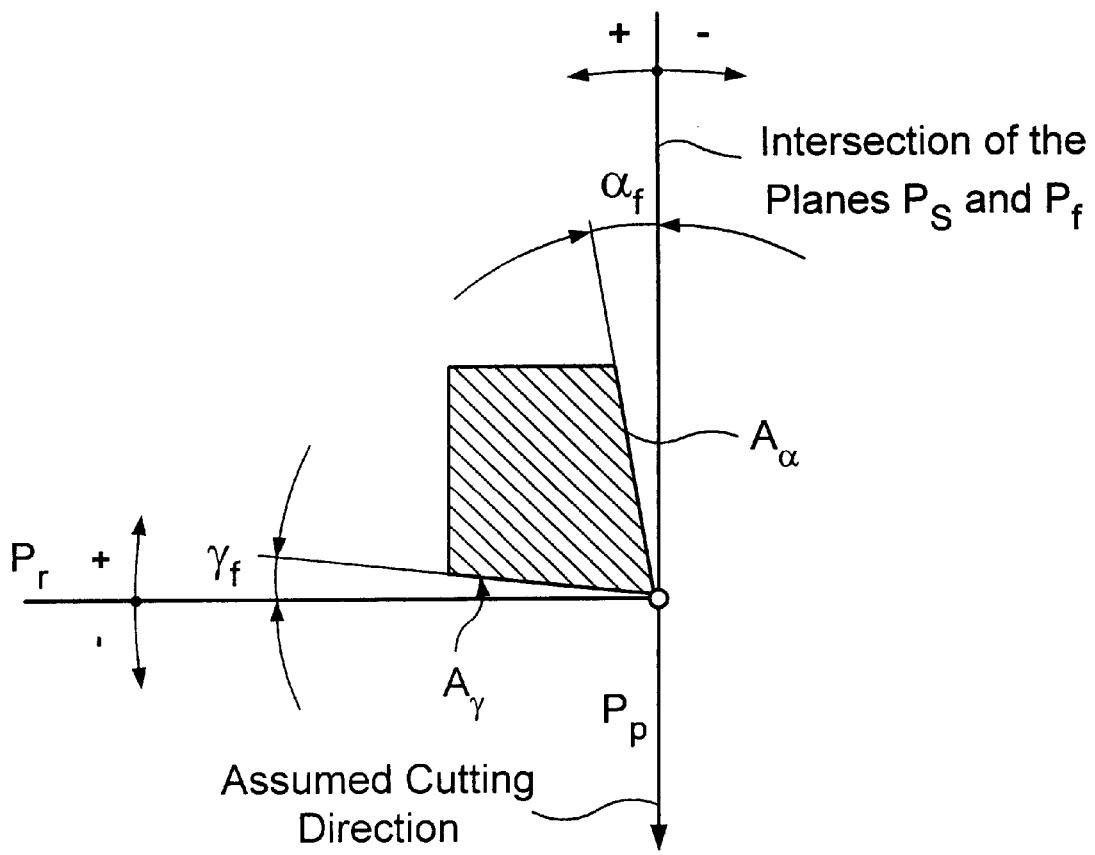
Figure 18B:
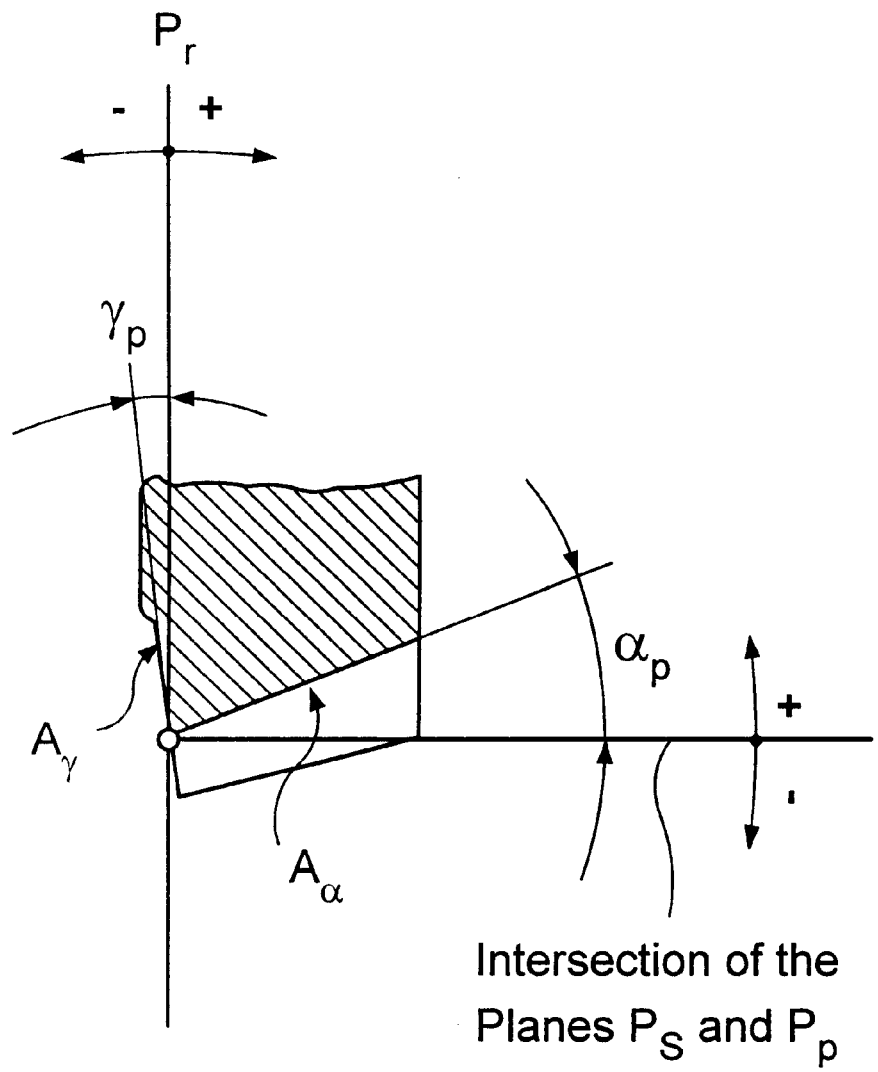
Figure 18C:
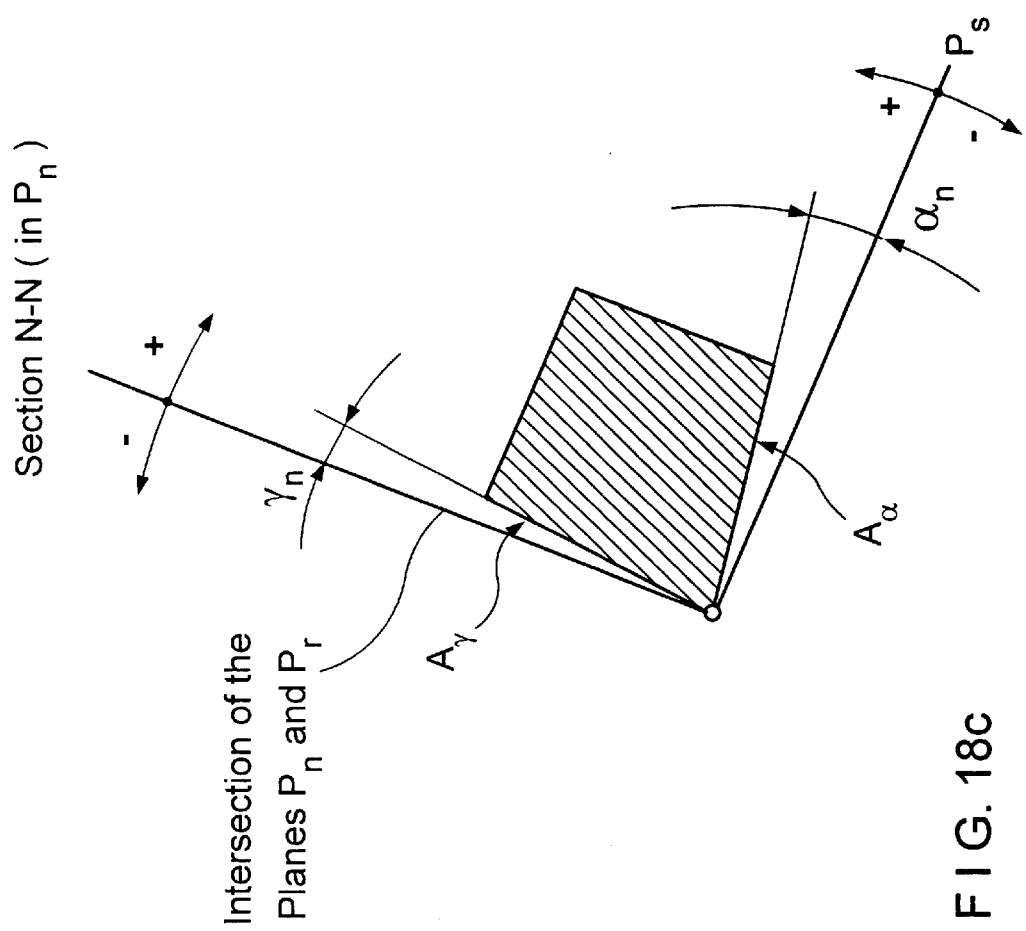
Figure 18D:
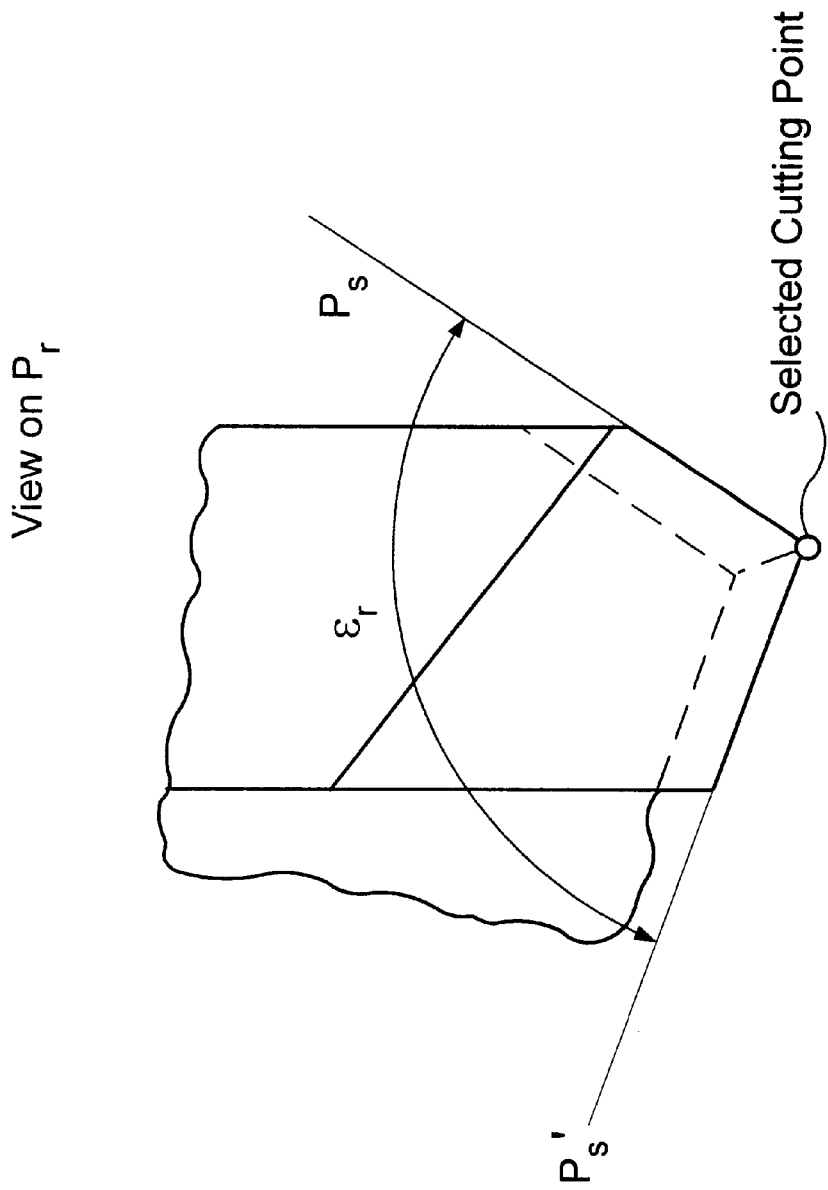
Figure 18F:
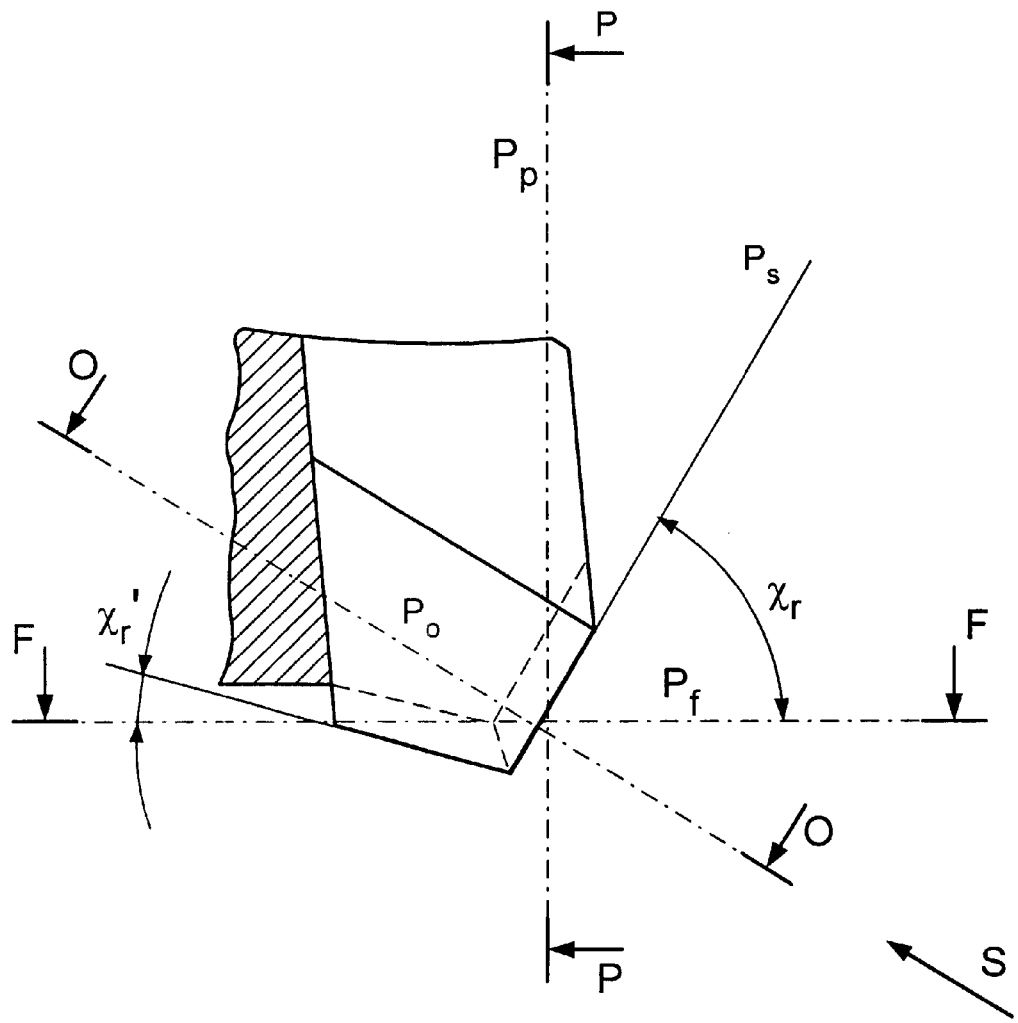

The orientation of the individual tool cutting edges with respect to the workpiece can be seen more clearly from FIGS. 15 and 16, separately for plain turning and face turning. Considered in this plan view, the tool has at its cutting-edge point a tool nose angle $\epsilon_r$ between the tool cutting-edge plane $P_s$ of the main cutting edge and the tool cutting-edge plane $P'_s$ of the secondary cutting edge, measured in the tool reference plane $P_r$.

In this case, the main cutting edge is at a tool adjustment angle $\kappa_r$ between the tool cutting-edge plane $P_s$ and the assumed working plane $P_f$, measured in the tool reference plane $P_r$.

FIGS. 18a–18f directly show the position of the individual sections and views, some of which are from FIGS. 15 and 16.

The relevant angles here are:

Tool side rake $\gamma_f$: angle between the tool face $A_\gamma$ and the tool reference surface $P_r$, measured in the working plane $P_f$;

Tool rear rake $\gamma_p$: angle between the tool face $A_\gamma$ and the tool reference plane $P_r$, measured in the tool rear plane $P_p$;

Tool normal cutting rake $\gamma_n$: angle between the tool face $A_\gamma$ and the tool reference plane $P_r$, measured in the tool cutting-edge normal plane $P_n$; the value of this angle $\gamma_n$ (positive or negative) is usually referred to in a generalized way as "positive/negative tool geometry".

Tool cutting-edge angle of inclination $\lambda_s$ (FIG. 18e): angle between the cutting edge S and the tool reference point $P_r$, measured in the tool cutting-edge plane $P_s$.

This tool cutting-edge angle of inclination $\lambda_s$ is an acute angle, the point of which faces towards the tool nose. It is positive when the cutting edge, to be viewed starting from the tool nose, lies on that side of the tool reference plane $P_r$ which faces away from the assumed cutting direction.

$\alpha$ generally denotes the clearance angle of a cutting edge.

FIG. 19 shows a web-cutting tip, which is screwed on the end side, preferably on both sides, onto the disc-like base body of the milling cutter and thus protrudes beyond the base body both radially and on the end side. In order to abrade the material from the end face of the web, with the milling cutter rotating the latter is moved forwards in the X-direction, that is to say radially with respect to the workpiece, as the feed direction. Here, the plane of the bit-like web-cutting tip, i.e. the tool cutting-edge plane $P_s$, is positioned at a small angle $\kappa$ to the working plane $P_f$, which is composed of the feed direction (X-direction) and the cutting direction, which lies in the X-Y plane. As a result, the outer edge, which is rounded with the nose radius R of about 1.6 mm, of the cutting bit projects obliquely outwards from the base body and forms the point which protrudes furthest axially with respect to the base body of the milling cutter.

The larger the angle $\kappa$, the more wavy the machined end face of the web becomes, as can be seen from the already machined part in FIG. 19.

Figure 19A:
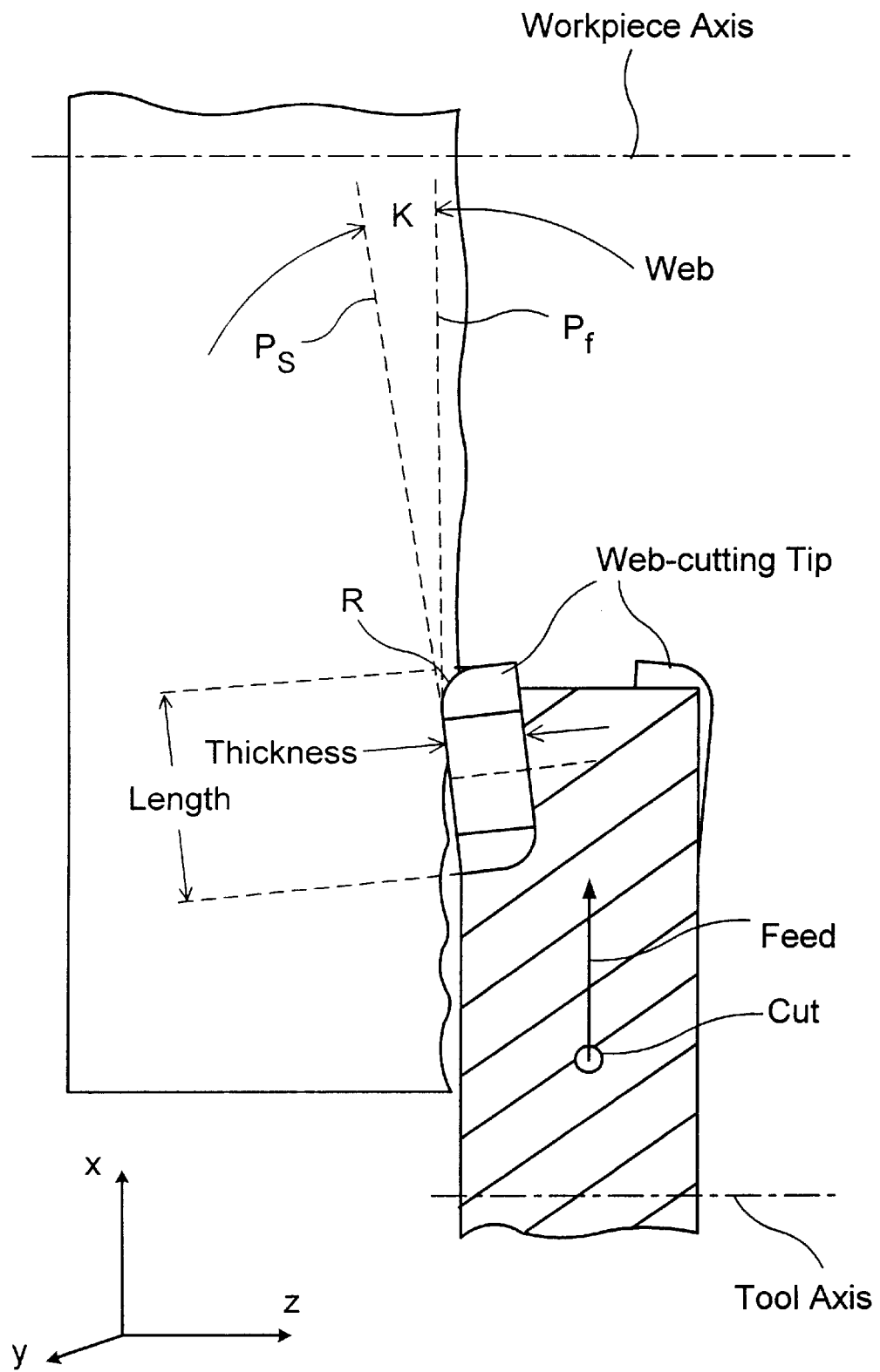
FIG. 19b: shows the insert of a journal-cutting tip, in the Y-direction of viewing.

In order to be able to machine the entire end face of a web, an additional rotation of the crankshaft may additionally be necessary as well as the feed, depicted in FIG. 19a, in the X-direction of the milling cutter, if, for example, it is intended to machine the web surface as far as the crankpin journal $H_2$ and around the latter.

In the case of a web-cutting tip as shown in FIG. 19a, the extent of the tip in the radial direction of the body of the milling cutter is referred to as the length of the cutting tip, the extent in the tangential direction of the disc-like base body of the tool is referred to as the width, and the extent in the direction of the cutting bit closest to the axial direction is referred to as the thickness.

Figure 19B:
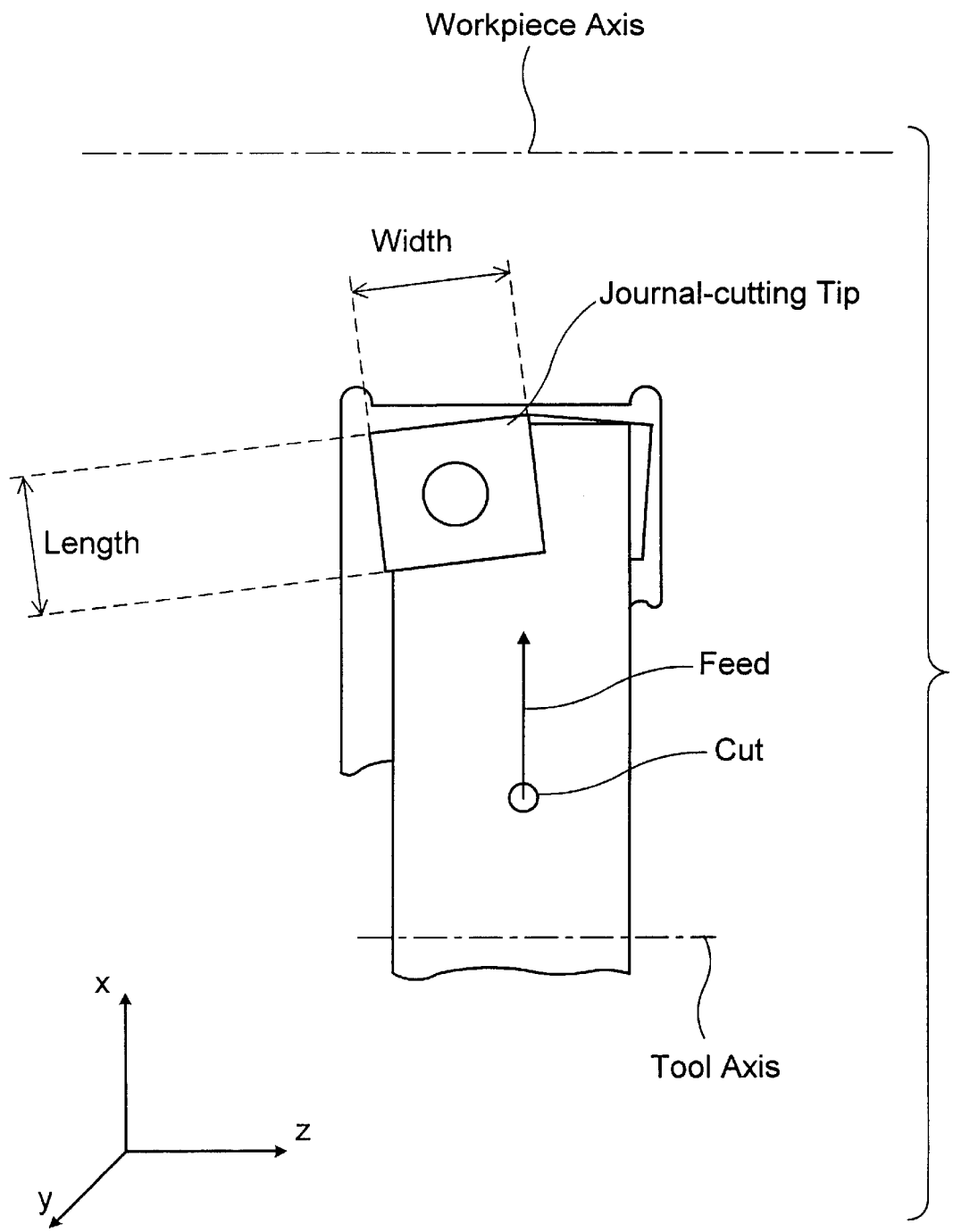

FIG. 19b shows, in the same direction of viewing as FIG. 19a, the machining of the peripheral surface of a journal of the crankshaft by means of a journal-cutting tip. For a tip of this kind, length and width are intended to mean the sides which can be seen in the plan view of FIG. 19b, square throw-away cutting-tool tips usually being used as journal-cutting tips; these throw-away cutting-tool tips can thus be used four times in succession.

The journal-cutting tips can then be fastened with their external cutting edge at a small angle deviating from the Z-direction within the Z-X plane on the base body of the side-milling cutter if, at the same time, a deviation from the Z-direction is also provided within the Z-Y plane.

What is claimed is:

1. Milling machine for machining workpieces having end faces and/or peripheral faces which are eccentric, comprising
    a bed (20),
    two chucks (21, 22) directed towards one another to hold the workpiece, at least one of which can be driven in rotation and positioned ($C_1$-axis) by means of a spindle head (23),
    a plurality of tool slide rests (25,26), at least two of which are offside tool slide rests which are movable transversely with respect to a Z-axis and each of which bears a milling cutter which can be driven in rotation,
    a control system (35), controlling both the rotation of the workpiece and also the transverse movement of the tool slide rests (25, 26) and rotation of the milling cutters,
    wherein the control system (35) makes it possible to input a plurality of correction values distributed over the circumference of a cylindrical peripheral face to be produced.

2. Milling machine according to claim 1, the milling cutter is an external-milling cutter.

3. Milling machine according to claim 1, wherein the chucks (21, 22) for holding a crankshaft (1) as workpiece are formed on the end-side end journal, on the one hand, and the end-side end flange, on the other hand.

4. Milling machine according to claim 1, wherein during machining of a crankshaft, the crankshaft is chucked in the chucks (21,22) on its centre axis being the axis of centre bearings (ML).

5. Milling machine according to claim 1, wherein the control system (35) controls the rotation of the milling cutters and the transverse movement of the tool slide rests (25, 26) as a function of a current movement and/or positioning of the workpiece.

6. Milling machine according to claim 1, wherein for the purpose of supporting a crankshaft in its central region during the machining a steady rest is arranged on the bed (25) which steady rest has at least three contact plates for bearing against a centre bearing (ML) of the crankshaft and bear in a sliding manner against the said centre bearing.

7. Milling machine according to claim 2, wherein the external-milling cutter is a side-milling cutter (5, 6) which rotates about an axis parallel to the Z-axis and has cutting edges on its circumferential region and in the transition region between its outer circumference and its end face.

8. Milling machine according to claim 2, wherein the external-milling cutter is a slotting cutter (37) which is directed towards the workpiece transversely with respect to the Z-axis.

9. Milling machine according to claim 8, wherein the slotting cutter (37) is pivotable about a $C_3$-axis which runs parallel to the Z-axis.

10. Milling machine according to claim 1, wherein the transverse movement of the tool slide rest (25, 26) with respect to the Z-axis is a linear movement in the X-direction.

11. Milling machine according to claim 1, wherein the transverse movement of the tool slide rests (25, 26) with respect to the Z-direction is a pivoting movement about a slide-rest pivot pin (43) which is parallel to the Z-direction.

12. Milling machine according to claim 1, wherein each of the two chucks (21, 22) can be driven in rotation and positioned by a spindle head (23, 24) and in particular the two spindle heads (23, 24) are electronically synchronised.

13. Milling machine according to claim 1, wherein one of the chucks (21, 22) is displaceable in the Z-direction.

14. Milling machine according to claim 1, wherein at least one of the slide rests (25, 26) is displaceable in the Z-direction.

15. Milling machine according to claim 1, wherein the control system (35) also controls the displaceability of the tool slide rests (25, 26) in the Z-direction.

16. Milling machine according to claim 1, wherein at least one of said plurarility of tool slide rests (25, 26) has a plurality of multiple tools (42), which are spaced apart axially in the Z-direction and are coupled in terms of rotational and/or pivoting movement thereof.

17. Milling machine according to claim 7, wherein the side-milling cutter (5, 6) has a diameter which is at least ten times the width of the side-milling cutter (5, 6) in the Z-direction.

18. Milling machine according to claim 7, wherein the rotational speed of the side-milling cutter (5, 6) is a multiple of the rotational speed of the workpiece.

19. Milling machine according to claim 1, wherein the rotational speed of the workpiece is less than 60 rpm.

20. Milling machine according to claim 1, wherein the cutting edges of the milling cutter have a positive tool geometry.

21. Milling machine according to claim 1, wherein the tool slide rest (25, 26) has a lower slide (29 and 30, respectively), which is displaceable along Z-guides (33) along the bed (20), on which lower slide the upper slide (27, 28) which bears the milling cutter is displaceable in the X-direction.

22. Milling machine according to claim 1, wherein the milling machine (2) comprises tool slide rests (25, 26) which are arranged above the spindle-head axis (MA).

23. Milling machine according to claim 22, wherein linear guides in the X-direction for the two tool slide rests (25, 26) are aligned one behind the other in the Z-direction.

24. Milling machine according to claim 1, wherein the directions of movement of the tool slide rests (25, 26) in the X-direction are arranged in mirror-inverted fashion with respect to a vertical center plane (ME) running through a spindle-head axis.

25. Milling machine according to claim 22, wherein linear guides in the X-direction for the two tool supports (25, 26) is arranged at an angle of less than 45° with respect to the centre plane (ME).

26. Milling machine according to claim 1, wherein the milling machine has four tool slide rests (25, 26, 25', 26'), two of which are not arranged aligned with respect to the spindle-head axis.

27. Milling machine according to claim 1, wherein the direction of movement of a tool slide rest (25) in an X-direction is aligned with that of an opposite tool slide rest (25').

28. Milling machine according to claim 6, wherein the contact plates consist of cubic boron nitrite (CBN).

29. Milling machine according to claim 7, wherein the movement path of the centre point of the side-milling cutter (5, 6) in the transverse direction does not run through a spindle axis, and in particular runs with an inclination of the direction of movement with respect to a centre plane (ME) of less than 90° above the spindle axis.

* * * * *

UNITED STATES PATENT AND TRADEMARK OFFICE
CERTIFICATE OF CORRECTION

PATENT NO.    : 6,322,300 B1
DATED         : November 27, 2001
INVENTOR(S)   : Rolf Santorius et al.

It is certified that error appears in the above-identified patent and that said Letters Patent is hereby corrected as shown below:

<u>Title page,</u>
Item [30], should read as follows:
-- [30]  Foreign Application Priority Data
          Jul. 2, 1996   (DE)...................196 26 627 --

Signed and Sealed this

Twenty-second Day of October, 2002

Attest:

Attesting Officer

JAMES E. ROGAN
*Director of the United States Patent and Trademark Office*